US012735941B2

(12) United States Patent
Pereira

(10) Patent No.: US 12,735,941 B2
(45) Date of Patent: *Sep. 15, 2026

(54) INTELLIGENT AUTOMATED MOTORIZED WINDOW TREATMENT WITH INCREASED ENERGY EFFICIENCY AND METHOD OF USING SAME

(71) Applicant: MDC INTERIOR SOLUTIONS, LLC, Glendale Heights, IL (US)

(72) Inventor: Tyrone John Anthony Pereira, Mississauga (CA)

(73) Assignee: MDC INTERIOR SOLUTIONS, LLC, Glendale Heights, IL (US)

( * ) Notice: Subject to any disclaimer, the term of this patent is extended or adjusted under 35 U.S.C. 154(b) by 387 days.

This patent is subject to a terminal disclaimer.

(21) Appl. No.: 17/676,981

(22) Filed: Feb. 22, 2022

(65) Prior Publication Data

US 2022/0178203 A1 Jun. 9, 2022

Related U.S. Application Data

(63) Continuation of application No. 16/120,700, filed on Sep. 4, 2018, now Pat. No. 11,293,224, which is a (Continued)

(51) Int. Cl.

*E06B 9/68* (2006.01)
*E06B 9/322* (2006.01)
(Continued)

(52) U.S. Cl.

CPC ................ *E06B 9/72* (2013.01); *E06B 9/322* (2013.01); *E06B 9/38* (2013.01); *E06B 2009/2476* (2013.01); *E06B 2009/6818* (2013.01)

(58) Field of Classification Search

CPC .... E06B 9/38; E06B 2009/6818; E06B 9/322; E06B 9/72; E06B 2009/2476; E06B 9/42;
(Continued)

(56) References Cited

U.S. PATENT DOCUMENTS 5,413,161 A 5/1995 Corazzini
5,532,560 A 7/1996 Element et al.
(Continued)

FOREIGN PATENT DOCUMENTS

CN 112448442 A * 3/2021 ............. H02J 50/00
WO WO-2017050810 A1 * 3/2017

OTHER PUBLICATIONS

Machine translation of WO2017/050810A1 (Year: 2017).*
Machine translation CN112448442 (Year: 2021).*

*Primary Examiner* — Abe Massad
*Assistant Examiner* — Jeremy C Ramsey
(74) *Attorney, Agent, or Firm* — Woodard, Emhardt, Henry, Reeves & Wagner, LLP

(57) ABSTRACT

Various embodiments described herein relate to a self-contained, self-regulating intelligent automated window treatment with increased energy efficiency. In at least one embodiment, the window treatment consists of: (1) a headrail; (2) a tube located within the headrail; (3) a motor located within the headrail, preferably within the tube; (4) window treatment fabric with one terminus of the fabric affixed to the tube within the headrail, and with the fabric extending from the tube and out from the headrail; (5) a smart bottom rail attached to the terminus of the shade fabric furthest from the tube with the bottom rail containing, at least one sensor, at least one control button, and a battery that provides power to the sensor(s) and control button(s), and wherein the smart bottom rail communicates with the motor in the headrail. Types of sensors used may include environmental sensors, motion sensors, and inertial sensors.

(Continued)

In another embodiment of the invention, the battery in the bottom rail may be a rechargeable battery. In a further embodiment, the bottom rail may contain at least one solar panel, which may be used to provide charge to the rechargeable battery. In another embodiment of the invention, the headrail further consists of a solar panel and a rechargeable battery that may be charged by the solar panel. In a further embodiment solar power stored in the rechargeable battery of the bottom rail may be transferred to the rechargeable battery-powered motor of the headrail.

20 Claims, 26 Drawing Sheets

Related U.S. Application Data continuation-in-part of application No. 15/918,066, filed on Mar. 12, 2018, now Pat. No. 11,203,899.

(60) Provisional application No. 62/601,153, filed on Mar. 14, 2017.

(51) Int. Cl.

| | |
|---|---|
| ***E06B 9/38*** | (2006.01) |
| ***E06B 9/72*** | (2006.01) |
| *E06B 9/24* | (2006.01) |

(58) Field of Classification Search

CPC ............... E06B 9/68; E06B 2009/6809; E06B 2009/6836

See application file for complete search history.

(56) References Cited

U.S. PATENT DOCUMENTS

| | | | | |
|---|---|---|---|---|
| 7,389,806 | B2 | 6/2008 | Kates | |
| 8,299,734 | B2 | 10/2012 | Mullet et al. | |
| 8,525,462 | B2 | 9/2013 | Berman et al. | |
| 8,659,246 | B2 | 2/2014 | Mullet et al. | |
| 8,851,141 | B2 | 10/2014 | Blair et al. | |
| 8,950,461 | B2 | 2/2015 | Adams et al. | |
| 9,045,939 | B2 | 6/2015 | Blair et al. | |
| 10,227,822 | B2 | 3/2019 | Lagarde | |
| 2014/0027069 | A1 | 1/2014 | Oppizzi | |
| 2015/0226001 | A1 * | 8/2015 | Adams | E06B 9/72 160/84.02 |
| 2017/0051557 | A1 | 2/2017 | Hall et al. | |
| 2017/0342771 | A1 * | 11/2017 | Piekny | E06B 9/72 |
| 2018/0202224 | A1 * | 7/2018 | Kumar | E06B 9/42 |
| 2019/0048656 | A1 | 2/2019 | Combee | |
| 2019/0071926 | A1 * | 3/2019 | Hall | E06B 9/364 |
| 2019/0119978 | A1 | 4/2019 | Hall et al. | |

* cited by examiner

INTELLIGENT AUTOMATED MOTORIZED WINDOW TREATMENT WITH INCREASED ENERGY EFFICIENCY AND METHOD OF USING SAME

RELATED APPLICATION

This application is a continuation of U.S. patent application Ser. No. 16/120,700, filed Sep. 4, 2018, which is a continuation-in-part application of U.S. patent application Ser. No. 15/918,066, filed Mar. 12, 2018, which claims priority from a U.S. Provisional Patent Application No. 62/601,153, filed Mar. 14, 2017, the entire contents of all of which are hereby incorporated by reference.

FIELD OF THE INVENTION

The present invention relates in general to a self-contained, self-regulating intelligent automated window treatment with increased energy efficiency.

BACKGROUND OF INVENTION

There is no admission that the background art disclosed in this section legally constitutes prior art.

There have been many different types and kinds of motorized window treatments. For example, reference may be made to U.S. Pat. Nos. 5,413,161; 5,532,560; 8,299,734 B2; 8,525,462 B2; 8,659,246 B2; 8,851,141 B2; 8,950,461 B2; and 9,045,939 B2.

The use of integrated technological systems in buildings (both home and commercial) is one of the most significant new trends in digital innovation. Transitioning to a smarter building can improve the building occupant's control over every aspect of how the building operates, and increase the safety, energy efficiency, and accessibility of it as well. Smart building systems and devices often operate together, sharing consumer usage data among themselves and automating actions based on the building occupants' preferences.

The U.S. Department of Energy has stated that "When properly installed, window shades can be one of the simplest and most effective window treatments for saving energy" and advises that "You should lower shades on sunlit windows in the summer. Shades on the south side of a house should be raised in the winter during the day, then lowered during the night." https://www.energy.gov/energysaver/energy-efficient-window-treatments.

Energy efficiency can only be achieved if the window shades are raised or lowered to the optimal positions as environmental conditions change. This is a challenge with manual treatments and non-automated motorized treatments, it is unlikely to be done when the building occupant is absent, and it is an inconvenience to the building occupant to constantly adjust the window treatments when present. Thus these adjustments are often not done when needed. Furthermore, the majority of commercially available automated motorized window treatments are ideal for large office buildings, where environmental sensors can be mounted on the roof of the building. Although this allows for accurate environmental readings, this placement of sensors is less than ideal for many small commercial and residential buildings.

Thus there currently is a need for an automated motorized window treatment with increased energy efficiency that (1) allows for maximum light harvesting for the health of the building occupants; (2) allows for heat control by incremental movement of the shade with respect to sun position; (3) requires minimal effort from the building occupant; (4) is easy to install; and (5) is designed for use in small commercial and residential buildings.

SUMMARY OF THE INVENTION

The present invention relates in general to a self-contained, self-regulating intelligent automated window treatment with increased energy efficiency. In particular, in accordance with one embodiment, the invention relates to a self-contained, self-regulating intelligent automated window treatment with increased energy efficiency consisting of: (1) a headrail; (2) a tube located within the headrail; (3) a motor located within the headrail, preferably within the tube; (4) window treatment fabric with one terminus of the fabric affixed to the tube within the headrail, and with the fabric extending from the tube and out from the headrail; (5) a smart bottom rail attached to the terminus of the shade fabric furthest from the tube with the bottom rail containing, at least one sensor, at least one control button, and a battery that provides power to the sensor(s) and control button(s), and wherein the smart bottom rail communicates with the motor in the headrail. Types of sensors used may include environmental sensors, motion sensors, and inertial sensors. The environmental sensors may provide information that may be used to determine when the window treatment motor should automatically raise and lower the fabric and bottom rail of the window treatment with minimal effort from the user. The automatic adjustment of the position of the fabric and bottom rail of the window treatment may allow for a reduction of energy consumption by the user by decreasing the need for artificial lighting, heating, and air conditioning. The motion sensors may provide information regarding occupancy of the room in which the window treatment is located. This information may be used to automatically adjust the fabric and bottom rail of the window treatment according to user preferences. The inertial sensors may provide information regarding the movement of the fabric and bottom rail of the window treatment. This information may be used to automatically stop the movement of the fabric and bottom rail of the window treatment if it comes into contact with an object within the path of movement of the fabric and bottom rail of the window treatment.

In another embodiment of the invention, the battery in the bottom rail may be a rechargeable battery. In a further embodiment, the bottom rail may contain at least one solar panel, which may be used to provide charge to the rechargeable battery.

In another embodiment of the invention, the headrail further consists of a solar panel and a rechargeable battery that may be charged by the solar panel. In a further embodiment solar power stored in the rechargeable battery of the bottom rail may be transferred to the rechargeable battery-powered motor of the headrail.

BRIEF DESCRIPTION OF THE DRAWINGS

The features of this invention and the manner of attaining them will become apparent, and the invention itself will be best understood by reference to the following description of certain embodiments of the invention taken in conjunction with the accompanying drawings.

DETAILED DESCRIPTION OF THE INVENTION

Figure 1:
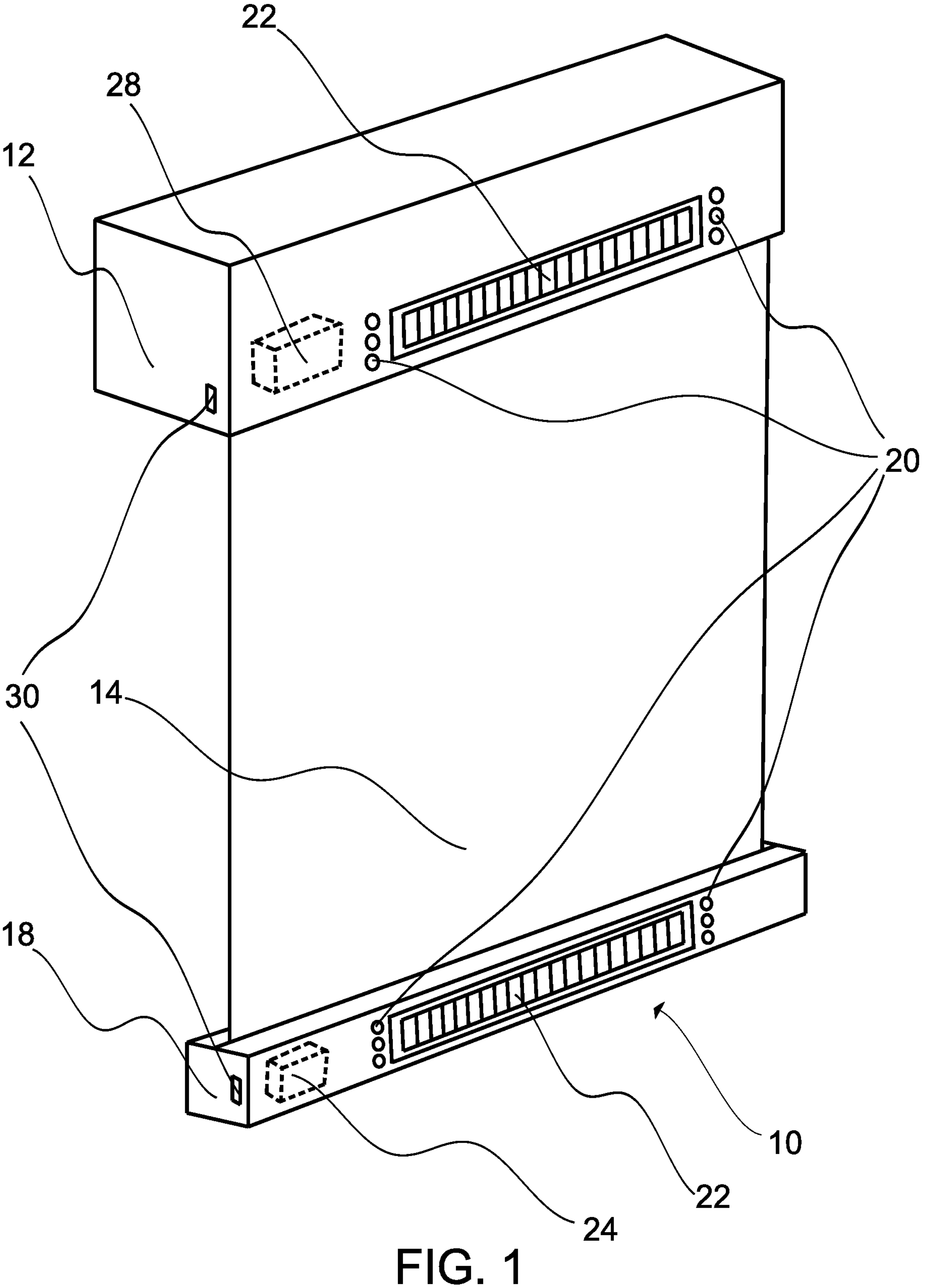
FIG. 1 is a perspective view of one embodiment of a self-contained, self-regulating intelligent automated window treatment viewed from the window facing side of the window treatment with the window treatment fabric and bottom rail adjusted to the lowest position.

It will be readily understood that the components of the embodiments as generally described and illustrated in the drawings herein, could be arranged and designed in a wide variety of different configurations. Thus, the following more detailed description of the embodiments of the system, components and method of the present invention, as represented in the drawings, is not intended to limit the scope of the invention, as claimed, but is merely representative of the embodiments of the invention.

Embodiments of the present invention provide a self-contained, self-regulating intelligent automated motorized window treatment with increased energy efficiency, wherein the window treatment is suitable for use in a small commercial or residential building.

In one embodiment of the invention a self-contained, self-regulating intelligent automated motorized window treatment with increased energy efficiency is a window treatment consisting of: (1) a headrail; (2) window treatment fabric with one terminus of the fabric affixed to a tube, and wherein the tube is located in the headrail; (3) a motor located in the headrail; (4) a smart bottom rail attached to the window treatment fabric at the fabric terminus opposite to the headrail terminus, and wherein the smart bottom rail communicates with the motor in the headrail; (5) at least one control button located on the smart bottom rail that may be used to raise or lower the position of the window treatment fabric and the bottom rail or to set a favorite position for the window treatment fabric and the bottom rail, and wherein the control button may be a physical button or an icon on a touch screen; (6) at least one sensor located on the smart bottom rail that may be selected from the group consisting of: environmental sensors (such as light sensors, temperature sensors, ultra violet light sensors, or humidity sensors); motion sensors (such as an occupancy sensor); and inertial sensors (such as accelerometers, gyroscopes, or magnetometers); and (7) a battery in the bottom rail to power the control buttons and sensors. The battery in the bottom rail may optionally be a rechargeable battery. The smart bottom rail may optionally contain at least one solar panel on the window-facing side of the smart bottom rail to provide power for the rechargeable battery of the smart bottom rail. Additional sensors may optionally be located on the headrail.

The inclusion of buttons directly upon the self-contained, self-regulating intelligent automated motorized window treatment will allow a user in close proximity to the window treatment greater freedom to control the window treatment at the moment a need for adjustment is noticed without requiring the user to locate a remote control or a smart device that may be used to direct the adjustment of the window treatment fabric and bottom rail position. This convenience will increase the energy efficiency of the window treatment.

The environmental sensors may provide information that may be used to determine when the window treatment motor should automatically raise or lower the position of the window treatment fabric and bottom rail with minimal effort from the user. The automatic adjustment of the window treatment fabric and bottom rail may allow for a reduction of energy consumption by the user by decreasing the need for artificial lighting, heating, and air conditioning. The motion sensors may provide information regarding occupancy of the room in which the window treatment is located. This information may be used to automatically adjust the position of the window treatment fabric and bottom rail according to user preferences. The inertial sensors may provide information regarding the movement of the window treatment fabric and bottom rail. This information may be used to automatically stop the movement of the window treatment fabric and bottom rail if either comes into contact with an object within the path of movement of the window treatment fabric or bottom rail.

The inclusion of environmental sensors within the self-contained, self-regulating intelligent automated motorized window treatment is an improvement over the current use of separate external sensors that are difficult to mount in an ideal location and are an unattractive addition to a window or it's surrounding area.

The smart bottom rail may communicate with the motor by any acceptable communication means, including, but not limited to, RF wireless, Bluetooth radio technology, piezo-electric RF technology, printed ink conductive line on the shade fabric, or conductive thread woven in the shade fabric.

In another embodiment of the invention, the headrail further consists of a solar panel and a rechargeable battery to power the motor, wherein the rechargeable battery may be charged by the solar panel. In a further embodiment solar power stored in the rechargeable battery of the bottom rail may be transferred to the rechargeable battery of the headrail.

In further embodiments of the above-described embodiments of the invention, the window treatment will include a charging and/or data transfer port, such as a universal serial bus (USB) port on the bottom rail and/or the headrail.

In another embodiment of the invention, a self-contained, self-regulating intelligent automated motorized window treatment with increased energy efficiency is a window treatment consisting of a headrail, window treatment fabric with one terminus of the window treatment fabric affixed to a tube, a smart bottom rail, a rechargeable battery-powered motor located within the headrail that communicates with the smart bottom rail attached to the window treatment fabric at the terminus opposite to the headrail terminus, at least one solar panel, a solar powered rechargeable battery, at least one sensor, at least one wireless charging transmitter, and at least one wireless charging receiver. The at least one solar cell is located on the window facing side of the bottom rail. Additional solar cells may be located on the window facing side of the headrail or on the room facing side of the bottom rail or headrail. The at least one solar cell will be connected to at least one solar powered rechargeable battery. The at least one sensor is located on the window facing side of the bottom rail. Additional sensors may be located on the window facing side of the headrail or on the room facing side of the bottom rail or headrail. The at least one wireless charging transmitter is located in the bottom rail and is connected to the solar powered rechargeable battery, and the at least one wireless charging receiver is located in the headrail and is connected to the rechargeable battery of the motor.

The smart bottom rail may communicate with the motor by any acceptable communication means, including, but not limited to, RF wireless, Bluetooth radio technology, piezoelectric RF technology, printed ink conductive line on the window treatment fabric, or conductive thread woven in the window treatment fabric.

In a further embodiment of the invention, a self-contained, self-regulating intelligent automated motorized window treatment with increased energy efficiency described above further has a charging and/or data transfer port, such as a USB port on the bottom rail and/or the headrail, and control buttons on the bottom rail and/or the headrail.

In further embodiments of the above described embodiments of the invention, the motor may include a wireless communication protocol means, such as Bluetooth, which will allow it to communicate directly with a software application (an app) on a mobile or desktop device without the need of communicating through additional hardware, such as a network hub. Alternatively, the communication may involve the use of a network hub, and the network hub might include a Global Positioning System (GPS) sensor.

The sensors may include, but are not limited to, environmental sensors, such as light sensors, temperature sensors, ultraviolet (UV) light sensors, and humidity sensors; motion sensors, such as occupancy sensors; and inertial sensors, such as accelerometers, gyroscopes, and magnetometers. The control buttons on the window treatment may include, but are not limited to, buttons for raising and lowering the position of the window treatment fabric and smart bottom rail and a button for the occupant's favorite position of the window treatment fabric and smart bottom rail. These buttons, when located on the smart bottom rail, may communicate with the headrail motor through a communication method, such as RF wireless (Bluetooth Radio technology or piezoelectric RF technology), printed ink conductive lines in the window treatment fabric, or conductive thread woven in the window treatment fabric. The control buttons may be physical buttons or icons on a touch screen.

In another embodiment of the invention the rechargeable battery in the headrail may be charged by a wireless power transfer method, such as inductive coupling and/or resonant charging (e.g., Qi or AirFuel), or radio frequency (RF) (e.g., AirFuel RF or WattUp) with power obtained from the solar cells and the charging port. Other methods of power transfer may include direct contact power transfer when the bottom rail comes into direct contact with the headrail; ambient RF charging; printed ink conductive lines in the fabric of the window treatment; and conductive thread woven in the fabric of the window treatment.

In a further embodiment of the invention, a self-contained, self-regulating intelligent automated motorized window treatment with increased energy efficiency is a motorized window treatment with the addition of a smart system unit contained within or affixed to the window treatment, wherein the smart system unit communicates with the motor of the motorized window treatment. The smart system unit includes (1) at least one sensor; (2) at least one control button; and (3) at least one battery that provides power to the sensors and the control buttons. In some embodiments the battery may be a rechargeable battery. In further embodiments the smart system unit may contain at least one solar panel that may be used to charge the rechargeable battery. The smart system unit may further include a charging and/or data transfer port, such as a USB port. The smart system unit may communicate with the motor by any acceptable communication means, including, but not limited to, RF wireless, Bluetooth radio technology, piezoelectric RF technology, printed ink conductive line on the window treatment fabric, or conductive thread woven in the window treatment fabric.

Further aspects of the invention will become apparent from consideration of the drawings and the ensuing description of preferred embodiments of the invention. A person skilled in the art will realize that the other embodiments of the invention are possible and that the details of the invention can be modified in a number of respects, all without departing from the inventive concept. Thus, the following drawings and description are to be regarded as illustrative in nature and not restrictive.

Figure 2:
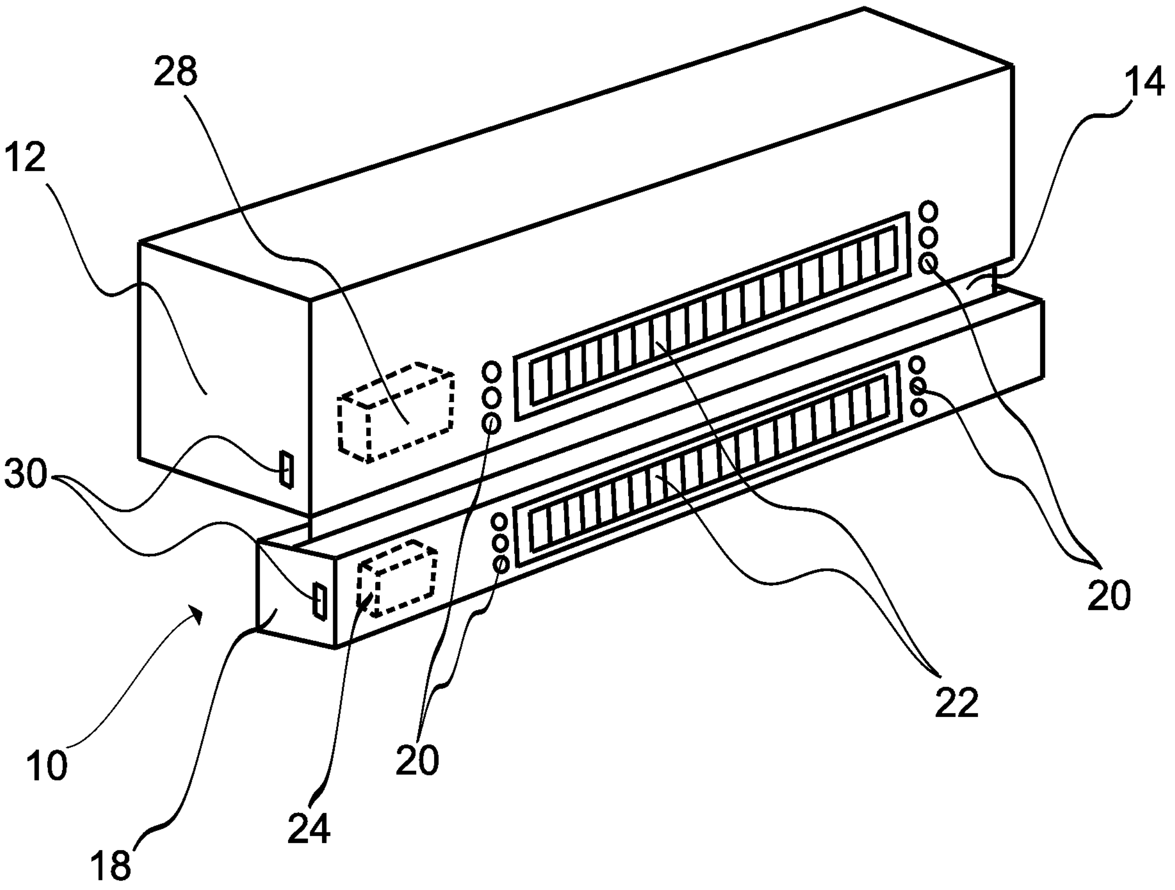
FIG. 2 is a perspective view of the self-contained, self-regulating intelligent automated window treatment of FIG. 1 viewed from the window facing side of the window treatment with the window treatment fabric and bottom rail adjusted to the highest position.
Figure 3:
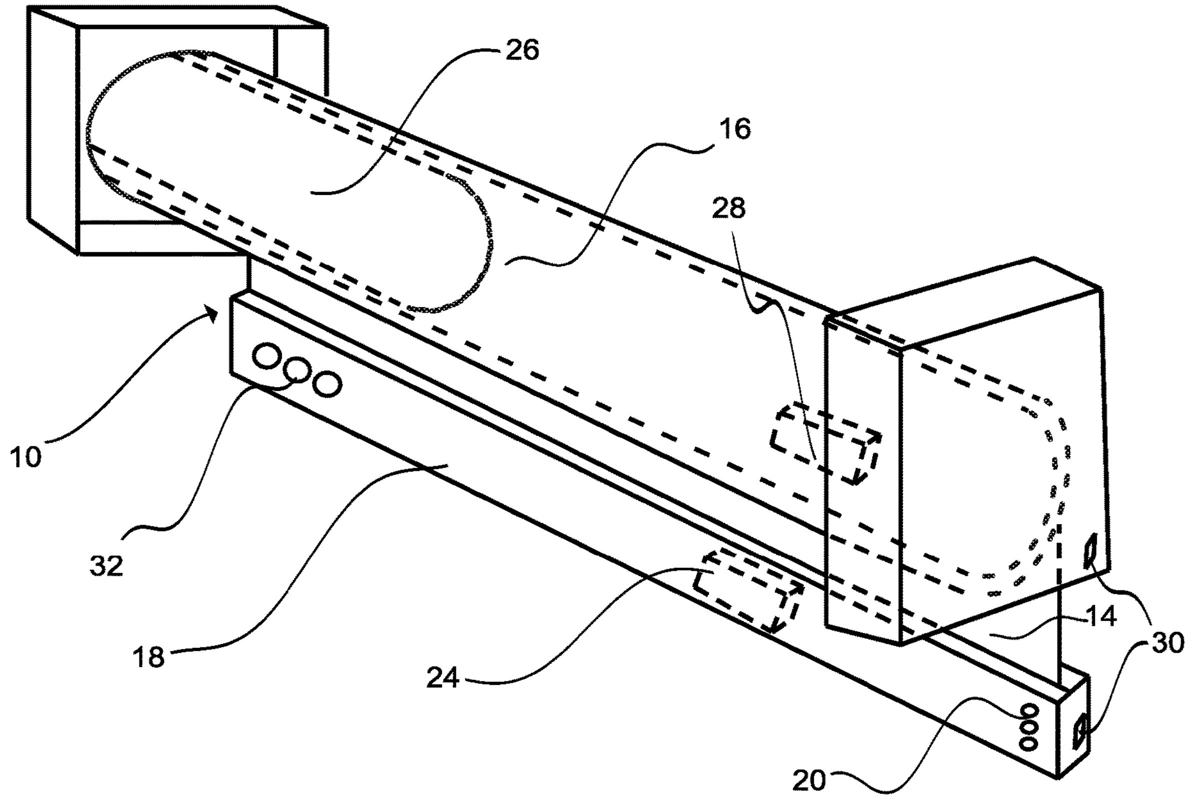
FIG. 3 is a perspective view of the self-contained, self-regulating intelligent automated window treatment of FIG. 1 viewed from the non-window side of the window treatment with the window treatment fabric and bottom rail adjusted to the highest position and with the headrail removed to show the parts contained within the headrail.
Figure 4:
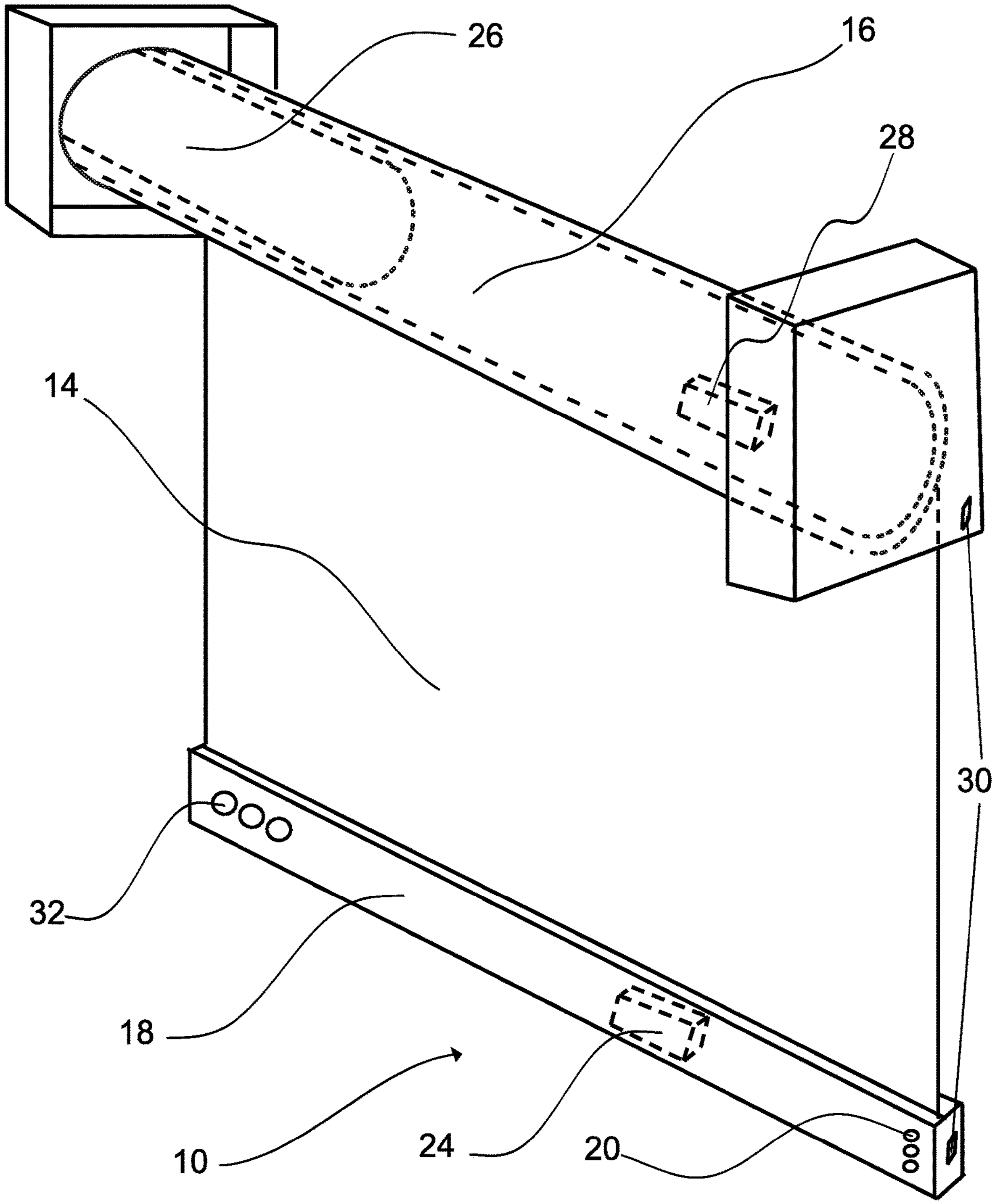
FIG. 4 is a perspective view of the self-contained, self-regulating intelligent automated window treatment of FIG. 1 viewed from the non-window side of the window treatment with the window treatment fabric and bottom rail adjusted to the lowest position and with the headrail removed to show the parts contained within the headrail.

One embodiment of the present invention is illustrated by way of example in FIGS. 1-4, which includes a self-contained, self-regulating intelligent automated motorized window treatment with increased energy efficiency 10. FIGS. 1 and 2 show the window treatment 10 viewed from the window facing side. FIGS. 3 and 4 show the window treatment 10 viewed from the non-window facing side. The window treatment 10 may be of any suitable size, shape, and type for its application, and consists of (1) a headrail 12; (2) window treatment fabric 14 with one terminus of the fabric affixed to a tube 16 within the headrail 12 and with the fabric 14 extending from the tube 16 out of the headrail 12; (3) a smart bottom rail 18 attached to the terminus of the window treatment fabric 14 furthest from the tube 16; (4) at least one sensor 20; (5) an optional solar panel 22 in the smart bottom rail 18 and/or in the headrail 12; (6) a battery 24 located in the smart bottom rail 18, wherein the battery 24 may be a rechargeable battery and may receive charge from the solar panel 22; and (7) a motor 26 powered by a battery 28 located in the headrail 12, wherein the battery 28 may be a rechargeable battery and may receive charge from the solar panel 22, and wherein the motor 26 communicates with the smart bottom rail 18. The smart bottom rail 18 may communicate with the motor 26 by any acceptable communication means, including, but not limited to, RF wireless, Bluetooth radio technology, piezoelectric RF technology, printed ink conductive line on the window treatment fabric, or conductive thread woven in the window treatment fabric. Additional solar panels 22 may be included on the smart bottom rail 18 and on the headrail 12. FIG. 1 shows the window treatment 10 with the window treatment fabric 14 and the smart bottom rail 18 in the fully lowered position. FIG. 2 shows the window treatment 10 with the window treatment fabric 14 and the smart bottom rail 18 in the fully raised position.

The sensors 20 may include, but are not limited to, an environmental sensor, such as a light sensor, a temperature sensor, a UV light sensor, or a humidity sensor; a motion sensor, such as an occupancy sensor; and an inertial sensor, such as an accelerometer a gyroscope, or a magnetometer.

The window treatment 10 may also contain a charging and/or data transfer port, such as a USB port 30 in the bottom rail 18 for data transfer and an alternate means of charging the rechargeable battery 24. An additional USB port may be located in the headrail 12 (not shown).

As shown in FIGS. 3 and 4, the smart bottom rail 18 may also contain one or more control buttons 32 that may be used to raise or lower the window treatment fabric 14 and the smart bottom rail 18 or to set a favorite position. The control buttons may be a physical button or icons on a touch screen. FIG. 3 shows the window treatment 10 with the window treatment fabric 14 and the smart bottom rail 18 in the fully raised position. FIG. 4 shows the window treatment 10 with the window treatment fabric 14 and the smart bottom rail 18 in the fully lowered position.

The optional solar panel 22 on the window-facing side of the smart bottom rail 18 may provide power for the battery 24 in the smart bottom rail, which is used to power the sensors 20 and the control buttons 32.

Figure 5:
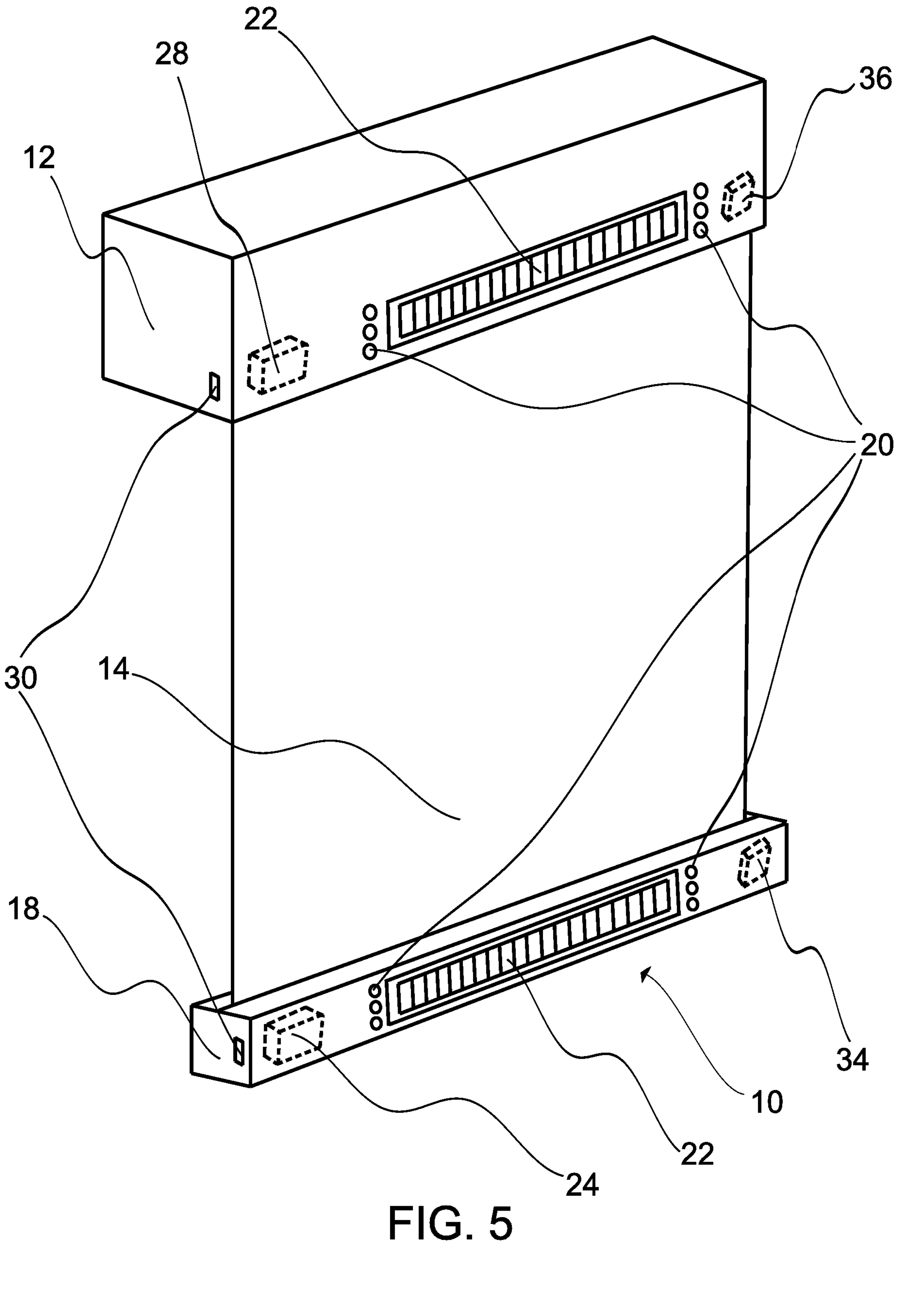
FIG. 5 is a perspective view of one embodiment of a self-contained, self-regulating intelligent automated window treatment viewed from the window facing side of the window treatment with the window treatment fabric and bottom rail adjusted to the lowest position. The window treatment contains a wireless charging transmitter in the bottom rail and a wireless charging receiver in the headrail.
Figure 6:
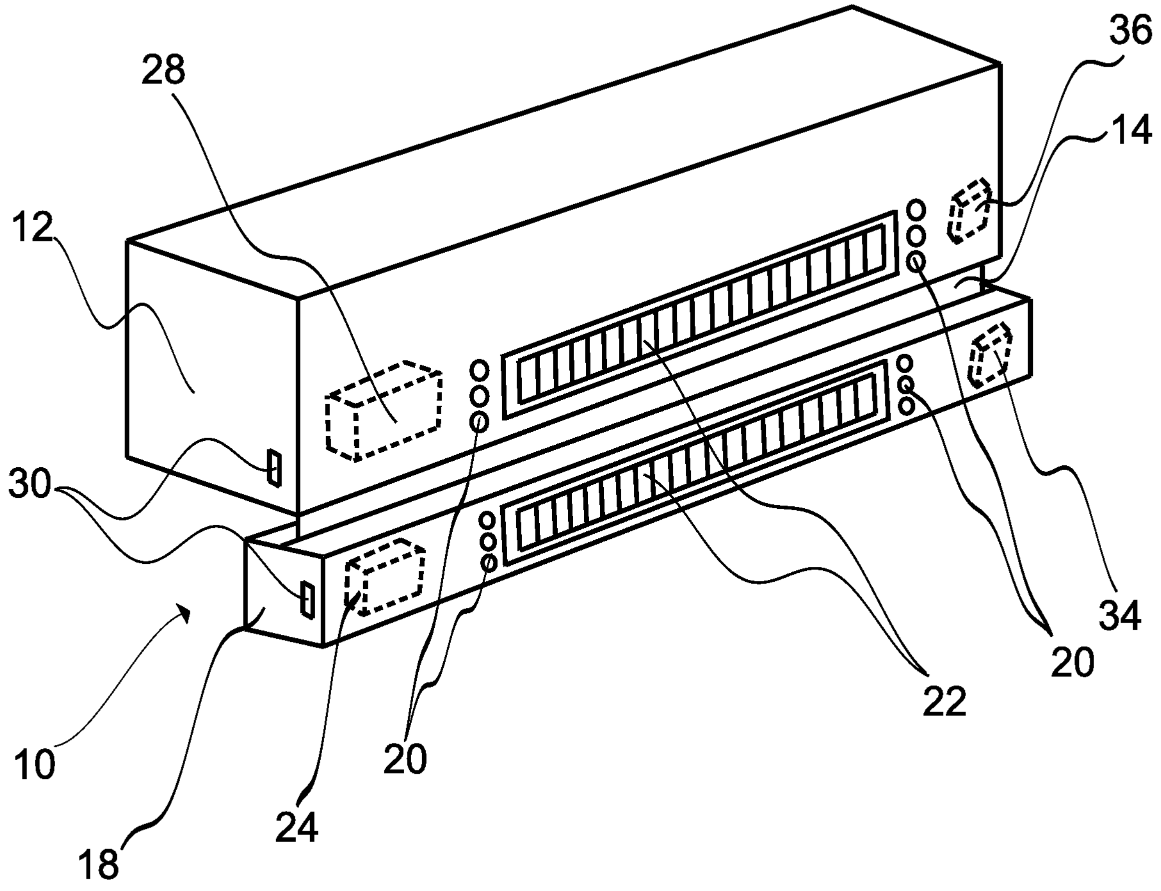
FIG. 6 is a perspective view of the self-contained, self-regulating intelligent automated window treatment of FIG. 5 viewed from the window facing side of the window treatment with the window treatment fabric and bottom rail adjusted to the highest position.
Figure 7:
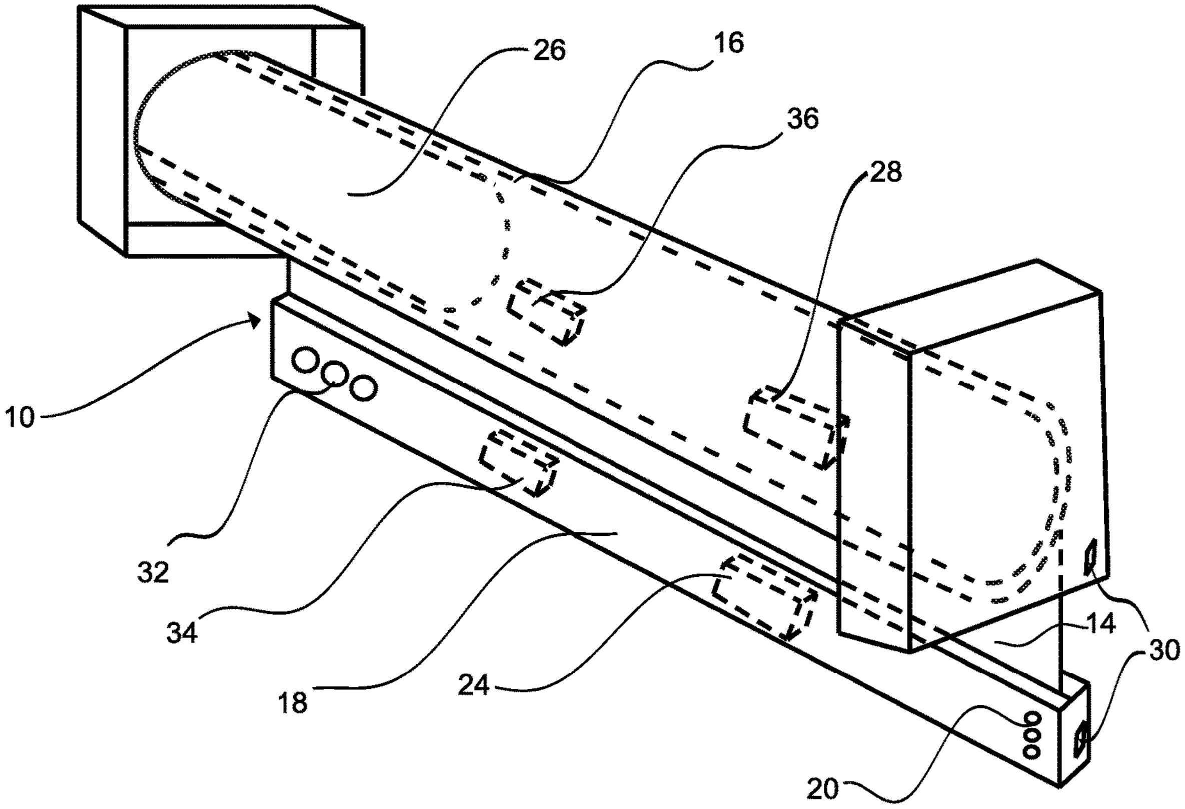
FIG. 7 is a perspective view of the self-contained, self-regulating intelligent automated window treatment viewed from the non-window side of the window treatment of FIG. 5 with the window treatment fabric and bottom rail adjusted to the highest position and with the headrail removed to show the parts contained within the headrail.
Figure 8:
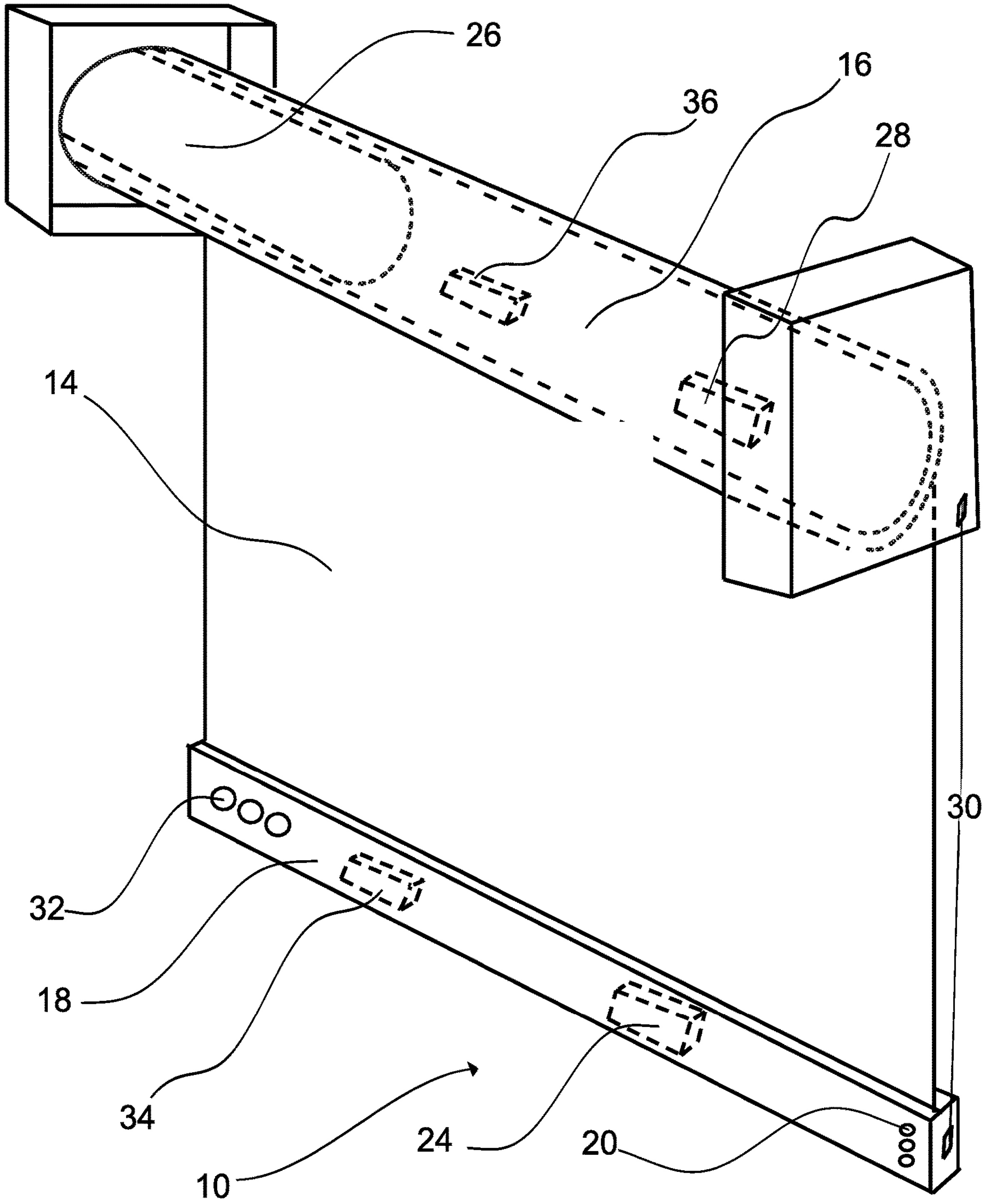
FIG. 8 is a perspective view of the self-contained, self-regulating intelligent automated window treatment of FIG. 5 viewed from the non-window side of the window treatment with the window treatment fabric and bottom rail adjusted to the lowest position and with the headrail removed to show the parts contained within the headrail.

Another embodiment of the present invention is illustrated by way of example in FIGS. 5-8, which includes a self-contained, self-regulating intelligent automated motorized window treatment with increased energy efficiency 10. FIGS. 5 and 6 show the window treatment 10 viewed from the window facing side. FIGS. 7 and 8 show the widow treatment 10 viewed from the non-window facing side. The window treatment 10 may be of any suitable size, shape, and type for its application, and consists of (1) a headrail 12; (2) window treatment fabric 14 with one terminus of the fabric affixed to a tube 16 within the headrail 12 and with the fabric 14 extending from the tube 16 out of the headrail 12; (3) a smart bottom rail 18 attached to the terminus of the window treatment fabric 14 furthest from the tube; (4) at least one sensor 20; (5) at least one solar panel 22 in the smart bottom rail 18; (6) a rechargeable battery 24 located in the smart bottom rail 18; (7) a wireless power transmitter 34 located in the smart bottom rail 18; (8) a wireless power receiver 36 located in the headrail 12; and (9) a motor 26 powered by a rechargeable battery 28 located in the headrail 12. The smart bottom rail 18 communicates with the motor 26 by any acceptable communication means, including, but not limited to, RF wireless, Bluetooth radio technology, piezoelectric RF technology, printed ink conductive line on the shade fabric, or conductive thread woven in the shade fabric. Solar power stored in the rechargeable battery 24 of the smart bottom rail 18 is transferred by way of the wireless power transmitter 34 and wireless power receiver 36 to the rechargeable battery 28 that powers the motor 26 within the headrail 12. Additional solar panels 22 may be included on the smart bottom rail 18 and on the headrail 12. FIG. 5 shows the window treatment 10 with the window treatment fabric 14 and the smart bottom rail 18 in the fully lowered position. FIG. 6 shows the window treatment 10 with the window treatment fabric 14 and the smart bottom rail 18 in the fully raised position.

The sensors 20 may include, but are not limited to, an environmental sensor, such as a light sensor, a temperature sensor, a UV light sensor, or a humidity sensor; a motion sensor, such as an occupancy sensor; and an inertial sensor, such as an accelerometer a gyroscope, or a magnetometer.

The window treatment 10 may also contain a charging and/or data transfer port, such as a USB port 30 for data transfer and an alternate means of charging the rechargeable battery 24. The USB port 30 may be located in the bottom rail 18 (as shown) or the headrail 12 (not shown).

In this embodiment of the window treatment 10 invention, power derived from the solar cell 22 or the USB charging port 30 of the smart bottom rail 18 is stored in the rechargeable battery 24 of the smart bottom rail 18 until it is wirelessly transferred from the wireless power transmitter 34 to the wireless power receiver 36 by way of a wireless power transfer method, such as inductive coupling, resonant charging or RF, where it is able to charge the rechargeable battery 28 of the headrail 12 to power the motor 26.

As shown in FIGS. 7 and 8, the smart bottom rail 18 may also contain one or more control buttons 32 that may be used to raise or lower the window treatment fabric 14 and the smart bottom rail 18 or to set a favorite position. The control buttons may be a physical button or an icon on a touch screen. FIG. 7 shows the window treatment 10 with the window treatment fabric 14 and the smart bottom rail 18 in the fully raised position. FIG. 8 shows the window treatment 10 with the window treatment fabric 14 and the smart bottom rail 18 in the fully lowered position.

The solar panel 22 on the window-facing side of the smart bottom rail 18 provides power for the rechargeable battery 24 in the smart bottom rail, which is also used to power the sensors 20 and the control buttons.

Figure 9:
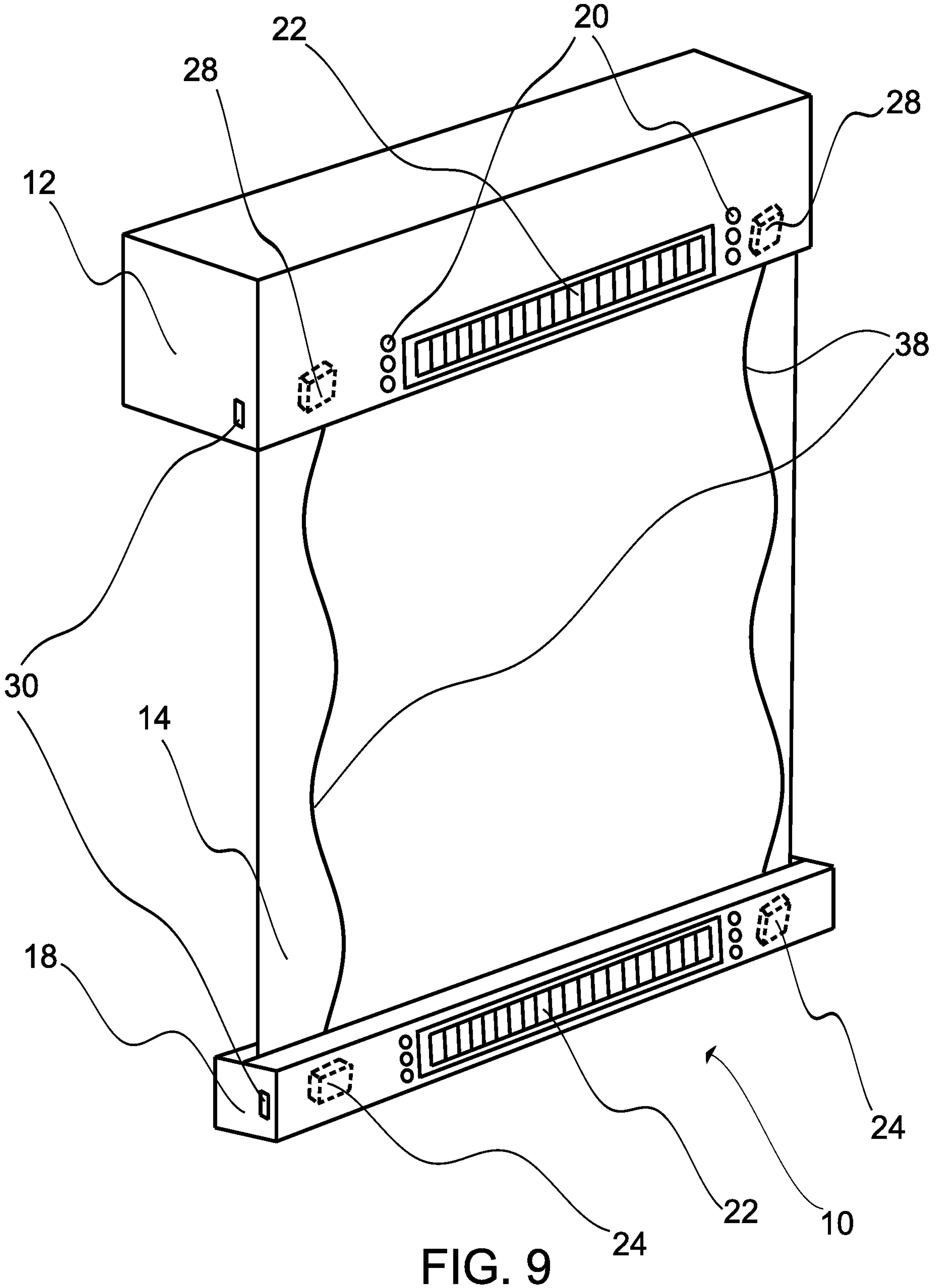
FIG. 9 is a perspective view of one embodiment of a self-contained, self-regulating, intelligent automated window treatment viewed from the window facing side of the window treatment with the window treatment fabric and bottom rail adjusted to the lowest position. The window treatment contains printed ink conductive lines printed on the shade fabric.

FIG. 9 shows another embodiment of a self-contained, self-regulating intelligent automated motorized window treatment with increased energy efficiency 10 invention, where power derived from the solar cell 22 or the USB charging port 30 of the smart bottom rail 18 is stored in the rechargeable battery 24 of the bottom rail 18 until it is transferred to the rechargeable battery 28 of the headrail 12 to power the motor 26, by way of printed ink conductive lines 38 printed onto the window treatment fabric 14.

Figure 10:
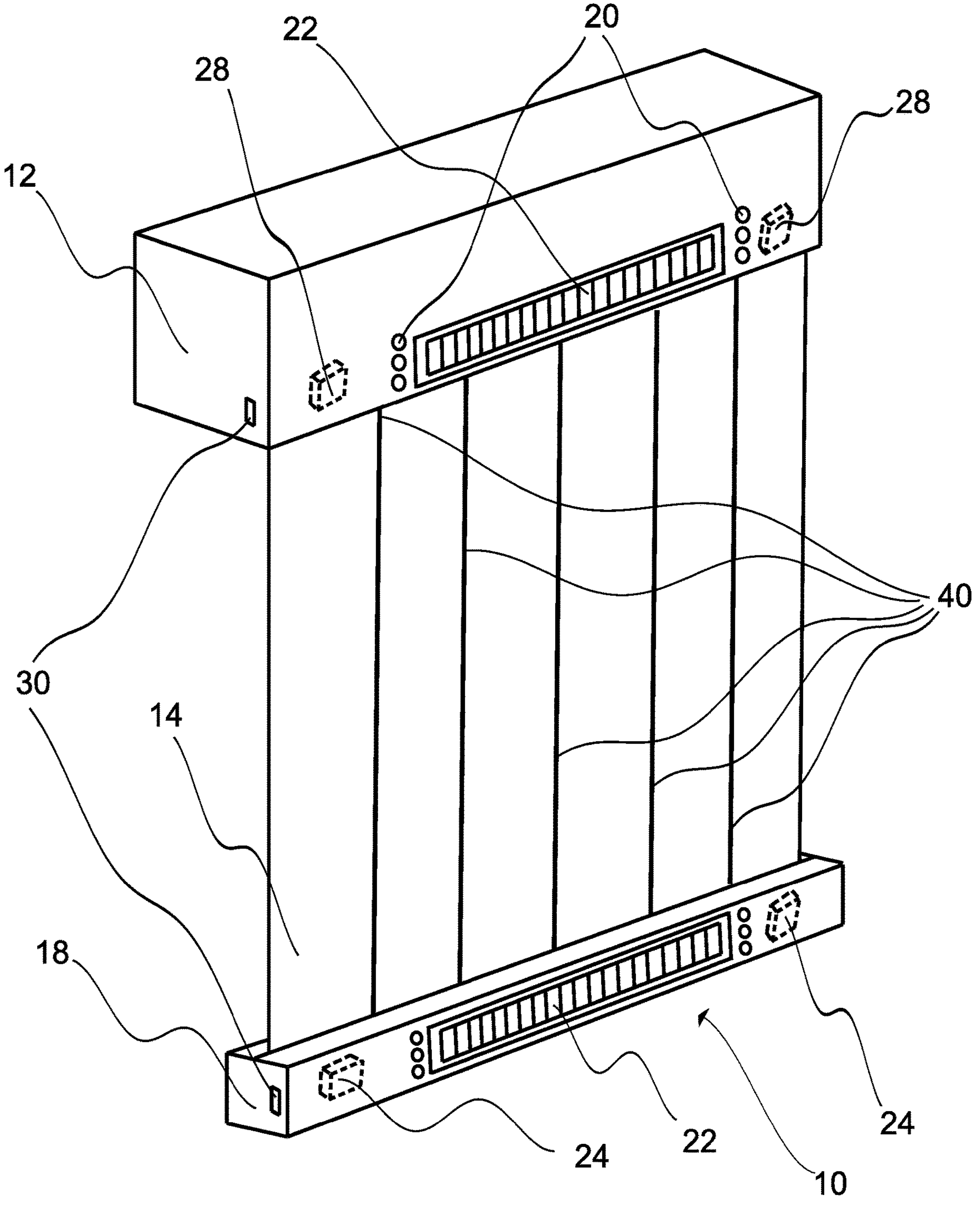
FIG. 10 is a perspective view of one embodiment of a self-contained, self-regulating, intelligent automated window treatment viewed from the window facing side of the window treatment with the window treatment fabric and bottom rail adjusted to the lowest position. The window treatment contains conductive thread woven into the fabric of the shade.

FIG. 10 shows another embodiment of a self-contained, self-regulating intelligent automated motorized window treatment with increased energy efficiency 10 invention, where power derived from the solar cell 22 or the USB charging port 30 of the smart bottom rail 18 is stored in the rechargeable battery 24 of the smart bottom rail 18 until it is transferred to the rechargeable battery 28 of the headrail 12 to power the motor 26, by way of conductive thread 40 woven into the window treatment fabric 14.

Figure 11:
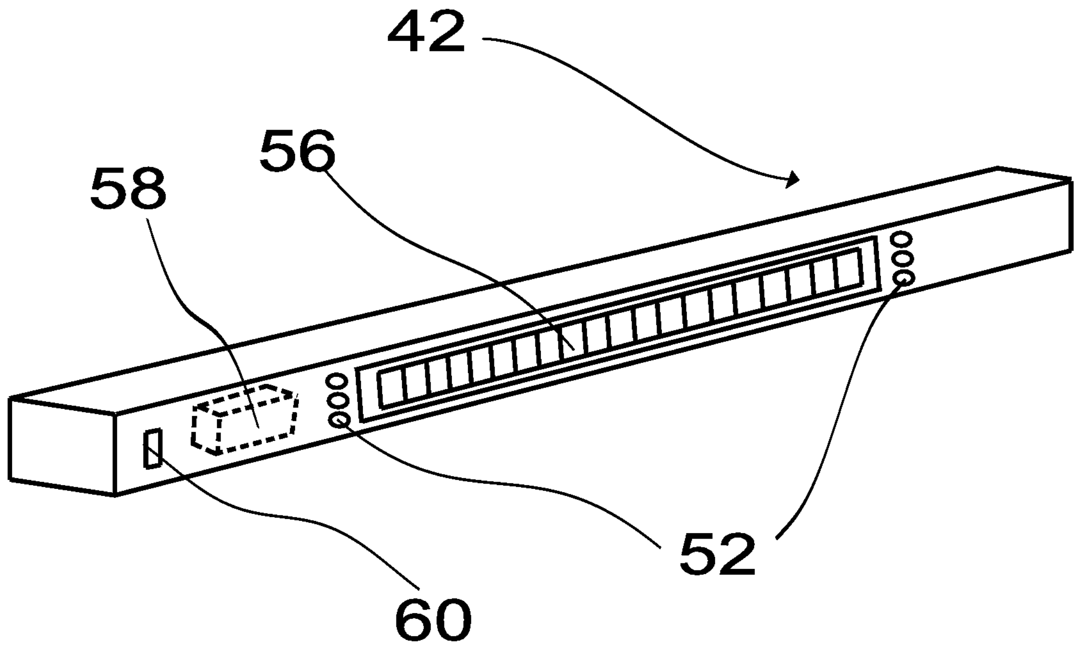
FIG. 11 is a perspective view of one embodiment of a self-contained, self-regulating, intelligent automated window treatment, wherein the embodiment consists of a smart system unit that can be inserted into a window treatment. The smart system unit is viewed from the window facing side of the unit.
Figure 12:
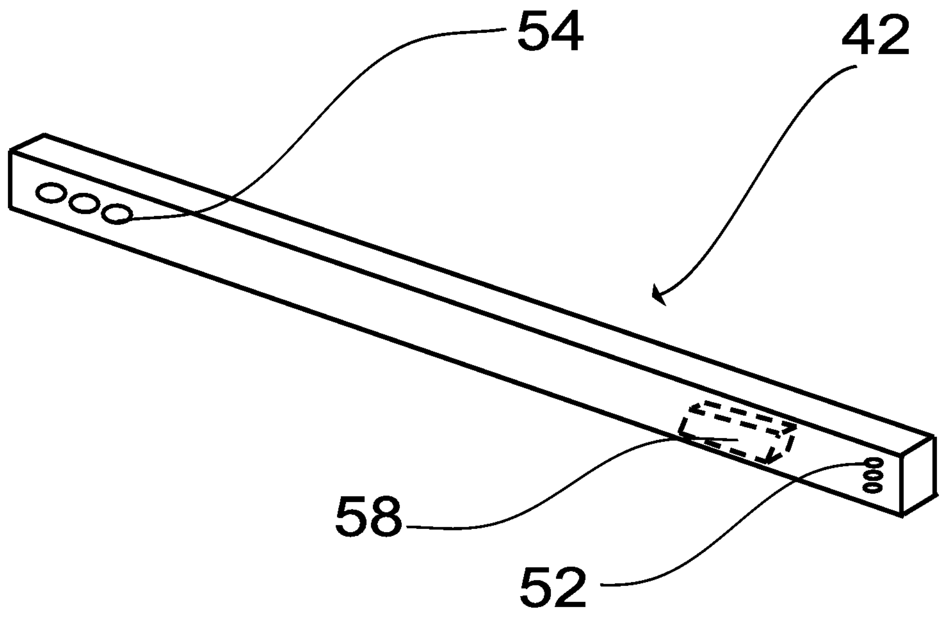
FIG. 12 is a perspective view of one embodiment of a self-contained, self-regulating, intelligent automated window treatment, wherein the embodiment consists of a smart system unit that can be inserted into a window treatment. The smart system unit is viewed from the non-window facing side of the unit.
Figure 13:
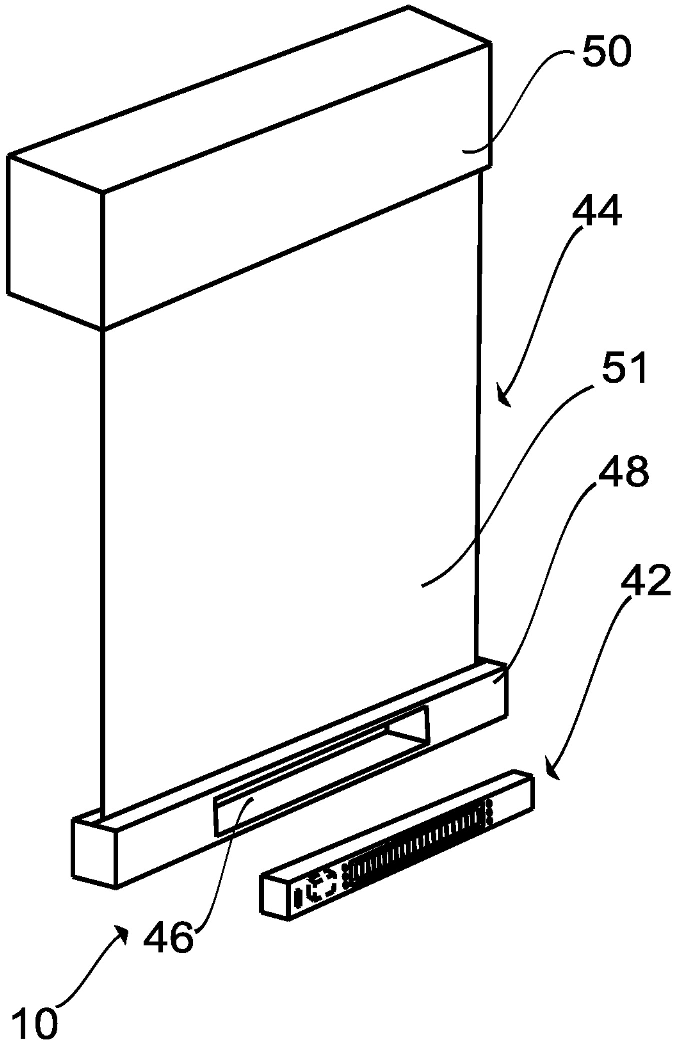
FIG. 13 is a perspective view of one embodiment of a self-contained, self-regulating, intelligent automated window treatment, wherein the embodiment consists of a smart system unit that can be inserted into a window treatment. The window facing side of the smart system unit and the window facing side of a window treatment with an opening in the bottom rail to accommodate the smart system unit is shown.
Figure 14:
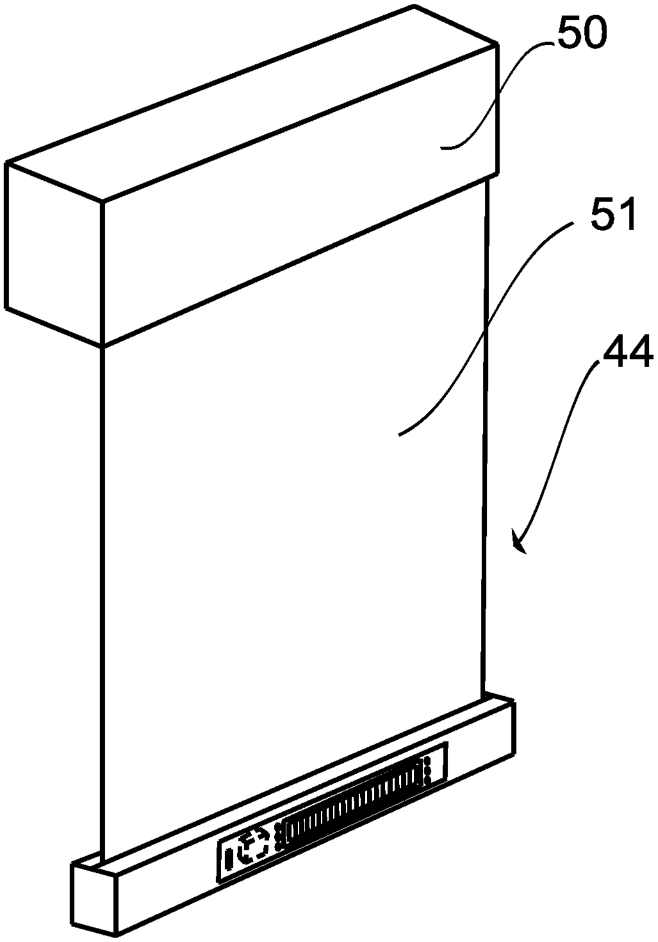
FIG. 14 is a perspective view of one embodiment of a self-contained, self-regulating, intelligent automated window treatment, wherein the embodiment consists of a smart system unit that can be inserted into a window treatment. The window facing side of the window treatment with the smart system unit installed within the bottom rail is shown.
Figure 15:
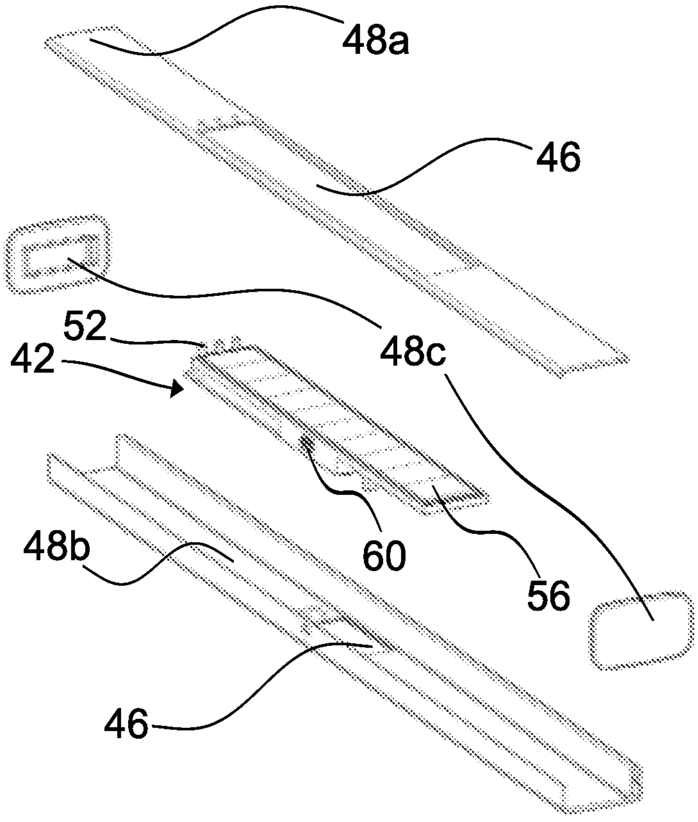
FIG. 15 is an exploded perspective view of one embodiment of a self-contained, self-regulating, intelligent automated window treatment, wherein the embodiment consists of a smart system unit that can be inserted into a window treatment, with a bottom rail and a smart system unit to be included within the bottom rail.
Figure 16:
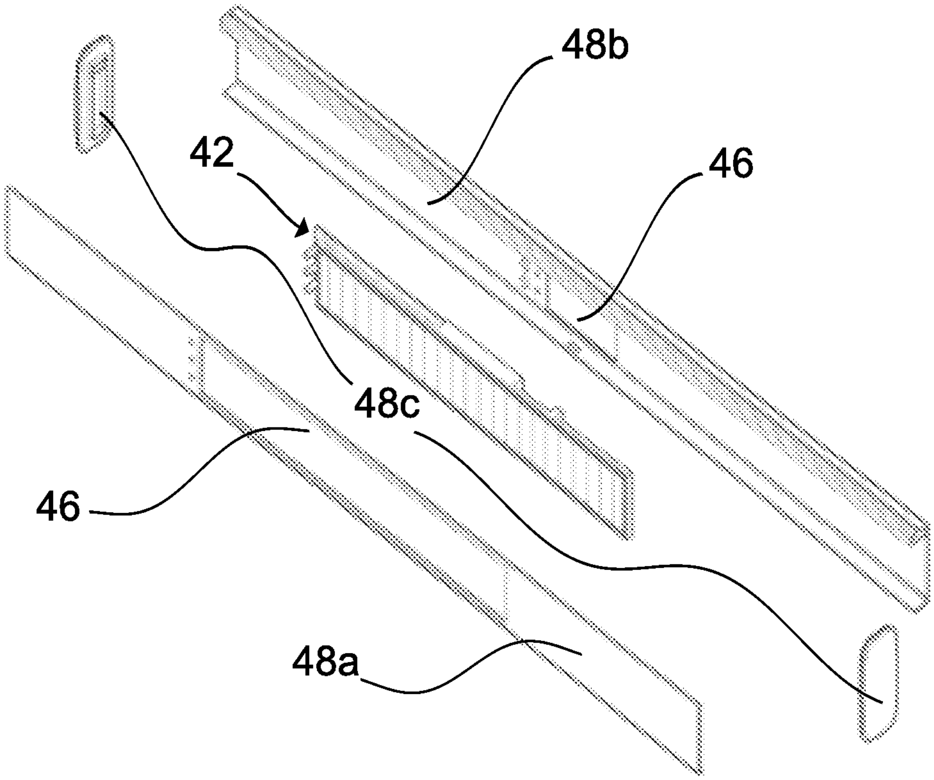
FIG. 16 is another exploded perspective view of one embodiment of a self-contained, self-regulating, intelligent automated window treatment, wherein the embodiment consists of a smart system unit that can be inserted into a window treatment, with the bottom rail and the smart system unit to be included within the bottom rail.
Figure 17:
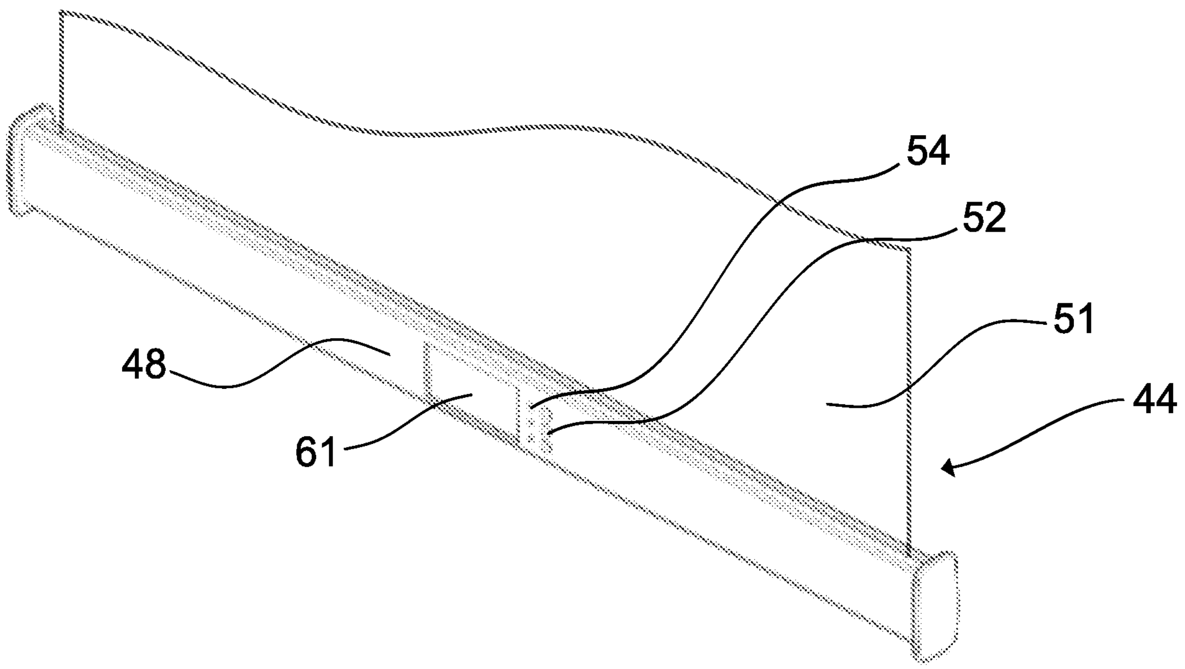
FIG. 17 is a perspective view of one embodiment of a self-contained, self-regulating, intelligent automated window treatment, wherein the embodiment consists of a smart system unit that can be inserted into a window treatment, with the non-window facing side of the assembled bottom rail containing a smart system unit.
Figure 18:
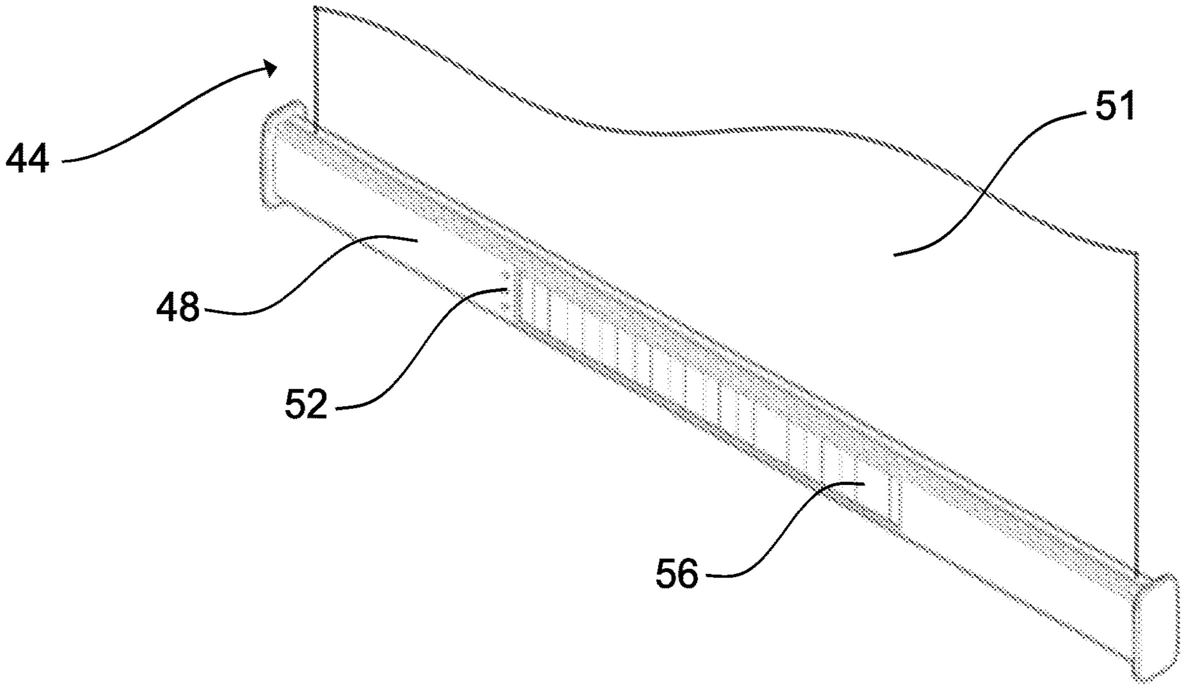
FIG. 18 is a perspective view of one embodiment of a self-contained, self-regulating, intelligent automated window treatment, wherein the embodiment consists of a smart system unit that can be inserted into a window treatment, with the window facing side of the assembled bottom rail containing a smart system unit.

FIGS. 11-18 show another embodiment of a self-contained, self-regulating intelligent automated motorized window treatment with increased energy efficiency 10 invention, wherein the window treatment 10 is a smart system unit 42 that can be fitted into a motorized window treatment 44 within an opening 46 in a bottom rail 48 or headrail 50 of the motorized window treatment 44. FIG. 11 shows the window facing side of the smart system unit 42. FIG. 12 shows the non-window facing side of the smart system unit 42. FIG. 13 shows the window facing side of the smart system unit 42 and the window facing side of a window treatment 44 that the smart system unit 42 is to be inserted into. The headrail 50 and window treatment fabric 51 are also shown. FIG. 14 shows the window facing side of the window treatment 44 with the smart system unit 42 inserted within the bottom rail 48 of the treatment 44. The headrail 50 and a portion of the window treatment fabric 51 are also shown. The smart system unit 42 consists of (1) at least one sensor 52; (2) at least one control button 54; (3) an optional solar panel 56; and (4) at least one battery 58 that may be rechargeable and that may be charged by the solar panels 56 and that provides power to the sensors 52 and the control buttons 54. The smart system unit may further include a charging and/or data transfer port, such as a USB port 60. The smart system unit 42 communicates with the motorized window treatment 44 by any acceptable communication means, including, but not limited to, RF wireless, Bluetooth radio technology, piezoelectric RF technology, printed ink conductive line on the shade fabric, or conductive thread woven in the shade fabric. FIG. 15 through FIG. 18 shows another means for fitting the smart system unit 42 within the opening 46 in the bottom rail 48. FIG. 15 and FIG. 16 show the smart system unit 42 separate from the bottom rail 48, with the unassembled bottom rail 48 broken into the window-facing side 48*a*, the non-window facing side 48*b*, and the end caps 48*c*. FIG. 17 shows the non-window facing side of the assembled bottom rail 48 containing the smart system unit 42 and an optional electronic display screen 61. The window treatment fabric 51 is also shown. FIG. 18 shows the window facing side of the assembled rail 48 containing the smart system unit 42. The window treatment fabric 51 is also shown.

Figure 19:
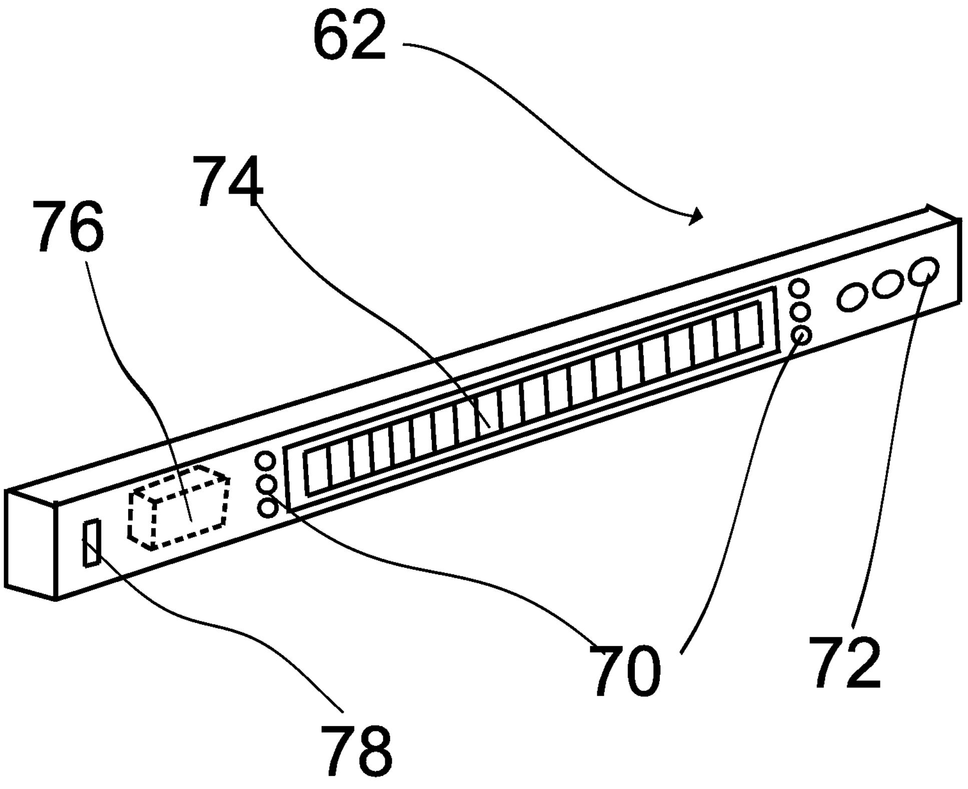
FIG. 19 is a perspective view of one embodiment of a self-contained, self-regulating, intelligent automated window treatment, wherein the embodiment consists of a smart system unit that can be attached to a window treatment, showing the window facing side of the smart system unit.
Figure 20:
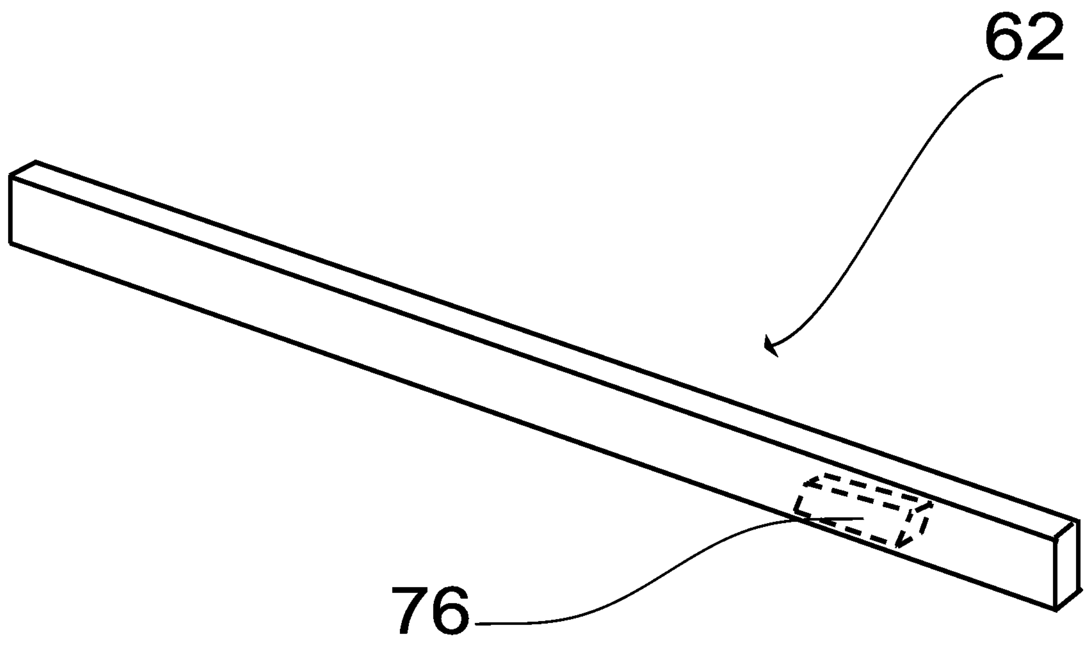
FIG. 20 is a perspective view of one embodiment of a self-contained, self-regulating, intelligent automated window treatment, wherein the embodiment consists of a smart system unit that can be attached to a window treatment, showing the non-window facing side of the smart system unit.
Figure 21:
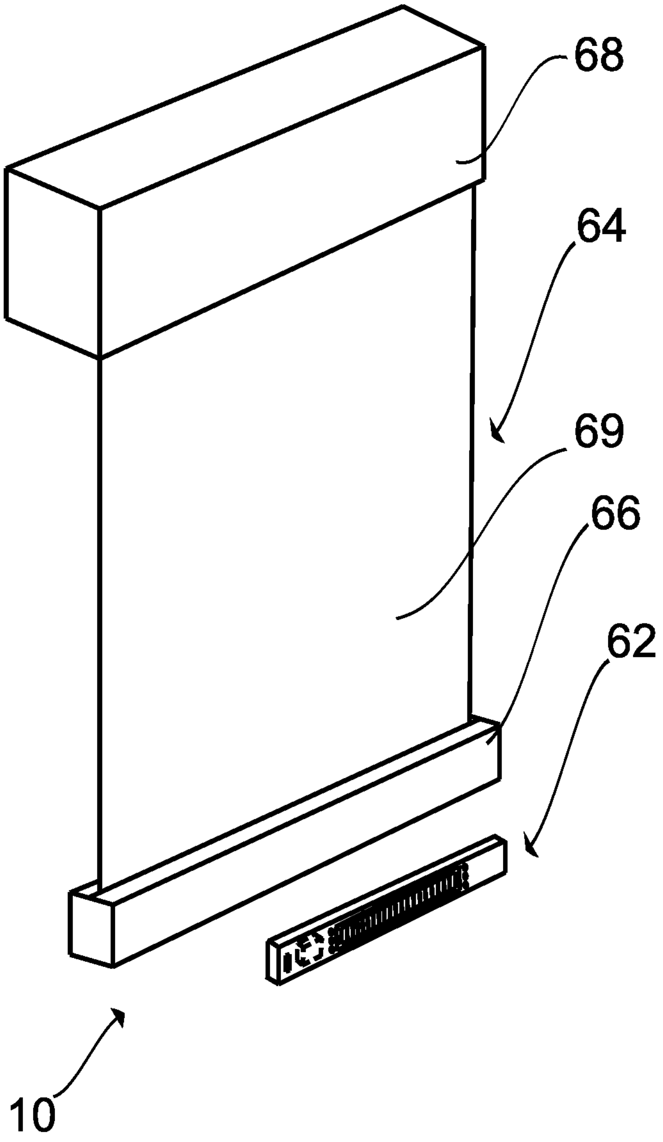
FIG. 21 is a perspective view of one embodiment of a self-contained, self-regulating, intelligent automated window treatment, wherein the embodiment consists of a smart system unit that can be attached to a window treatment, showing the window facing side of the smart system unit and the window facing side of the window treatment.
Figure 22:
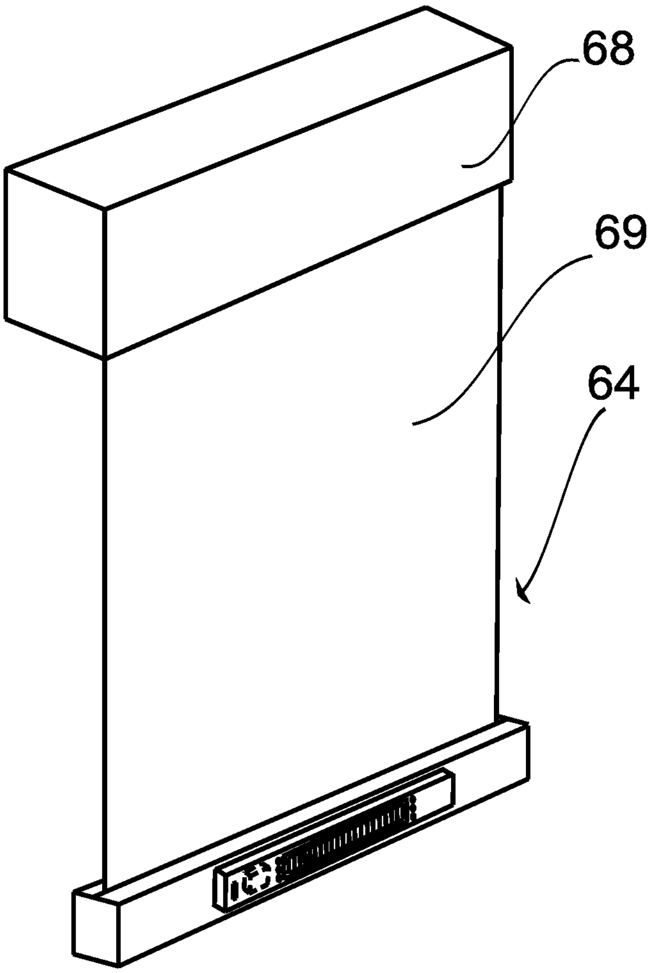
FIG. 22 is a perspective view of one embodiment of a self-contained, self-regulating, intelligent automated window treatment, wherein the embodiment consists of a smart system unit that can be attached to a window treatment, showing the window facing side of the window treatment with the smart system unit affixed to the bottom rail.

FIGS. 19-22 show another embodiment of a self-contained, self-regulating intelligent automated motorized window treatment with increased energy efficiency 10 invention, wherein the window treatment 10 is a smart system unit 62 that can be affixed to the surface of a motorized window treatment 64 on the bottom rail 66 or the headrail 68 of the motorized window treatment 64. FIG. 19 shows the window facing side of the smart system unit 62. FIG. 20 shows the non-window facing of the smart system unit 62. FIG. 21 shows the window facing side of the smart system unit 62 and the window facing side of a window treatment 64 that the smart system unit 62 is to be affixed to. The headrail 68 and window treatment fabric 69 are also shown. FIG. 22 shows the window facing side of the window treatment 64 with the smart system unit 62 affixed to the bottom rail 66 of the window treatment 64. The headrail 68 and window treatment fabric 69 are also shown. The smart system unit 62 consists of (1) at least one sensor 70; (2) at least one control button 72; (3) at least one solar panel 74; and (4) at least one battery 76 that may be rechargeable and that may be charged by the solar panels 74 and that provides power to the sensors 70 and the control buttons 72. The smart system unit may further include a charging and/or data transfer port, such as a USB port 78. The smart system unit 62 communicates with the motorized window treatment 64 by any acceptable communication means, including, but not limited to, RF wireless, Bluetooth radio technology, piezoelectric RF technology, printed ink conductive line on the shade fabric, or conductive thread woven in the window treatment fabric.

Figure 23:
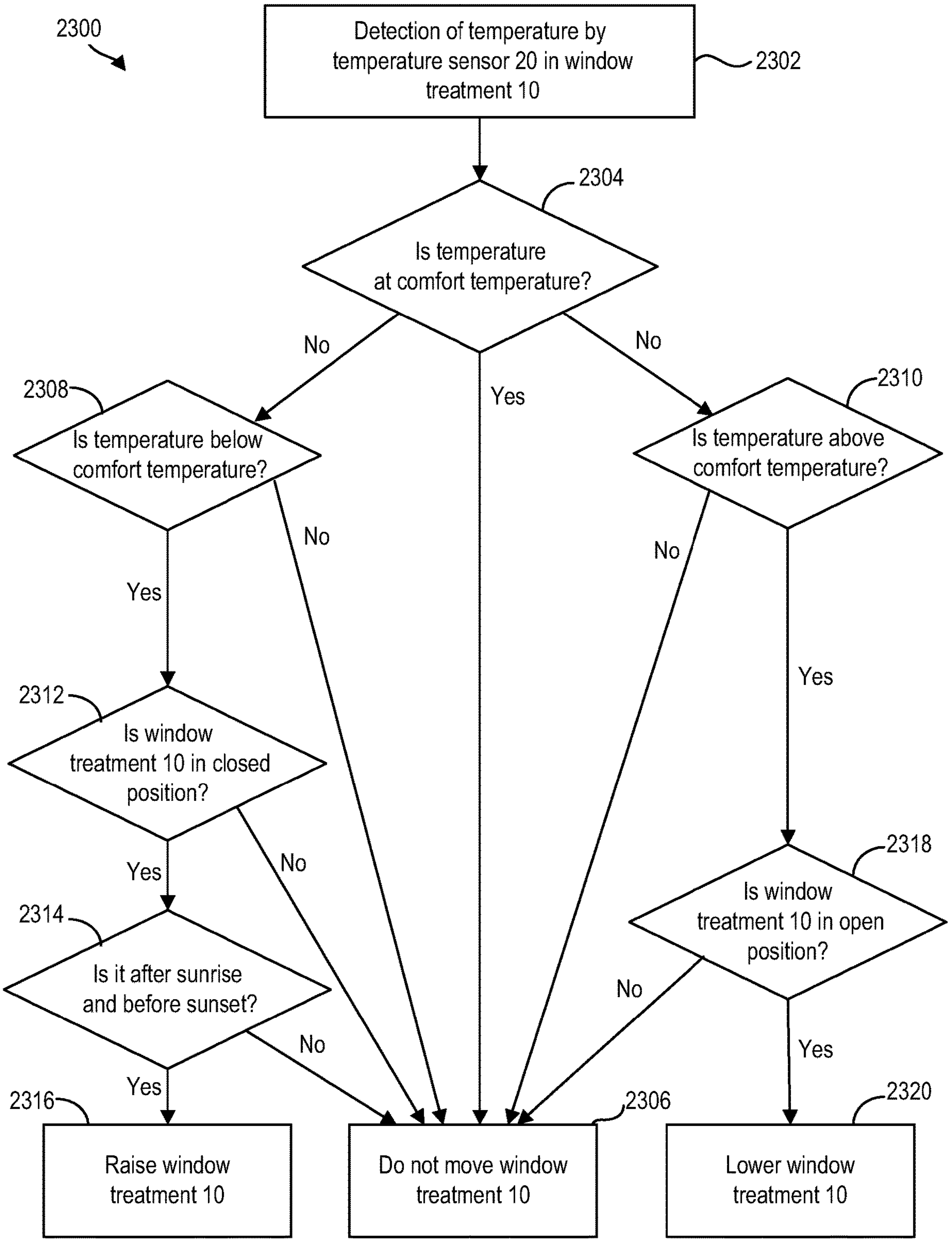
FIG. 23 is a simplified flowchart showing a visual representation of the sequence of steps and decisions to be performed by the self-contained, self-regulating, intelligent automated window treatment when determining when the window treatment should automatically raise and lower to allow for reduction of energy consumption using information from the temperature environmental sensor.

FIG. 23 is a simplified flowchart of an example method 2300 of the procedure that an embodiment of the self-contained, self-regulating intelligent automated motorized window treatment with increased energy efficiency 10 may follow after receiving input from a temperature environmental sensor 20.

As shown in method 2300, at 2302, the temperature is detected by a temperature sensor 20 in window treatment 10. At 2304, it is determined if the temperature is at a comfort temperature. If the temperature is at the comfort temperature, at 2306, the window treatment 10 is not moved. Otherwise, if the temperature is not at the comfort temperature, at 2308 and 2310, it is determined if the temperature is below the comfort temperature (2308) or above the comfort temperature (2310).

If, at 2308, the temperature is determined not to be below the comfort temperature, then at 2306, the window treatment 10 is not moved. Otherwise, if the temperature is below the comfort temperature at 2308, then at 2312, it is determined if the window treatment 10 is in the closed position. If the window treatment 10 is not in the closed position, then at 2306, the window treatment 10 is not moved. Otherwise, if the window treatment 10 is in the closed position, at 2314 it is determined if the time is after sunrise and before sunset. If the time is determined to be after sunrise and before sunset, then at 2316, the window treatment 10 is raised, otherwise at 2306, the window treatment 10 is not moved.

At 2310, if the temperature is not above the comfort temperature, the window treatment 10 is not moved. Otherwise, if the temperature is above the comfort temperature, at 2318, it is determined if the window treatment 10 is in the open position. If the window treatment 10 is in the open position, at 2320, the window treatment 10 is lowered, otherwise, the window treatment 10 is not moved at 2306.

Figure 24:
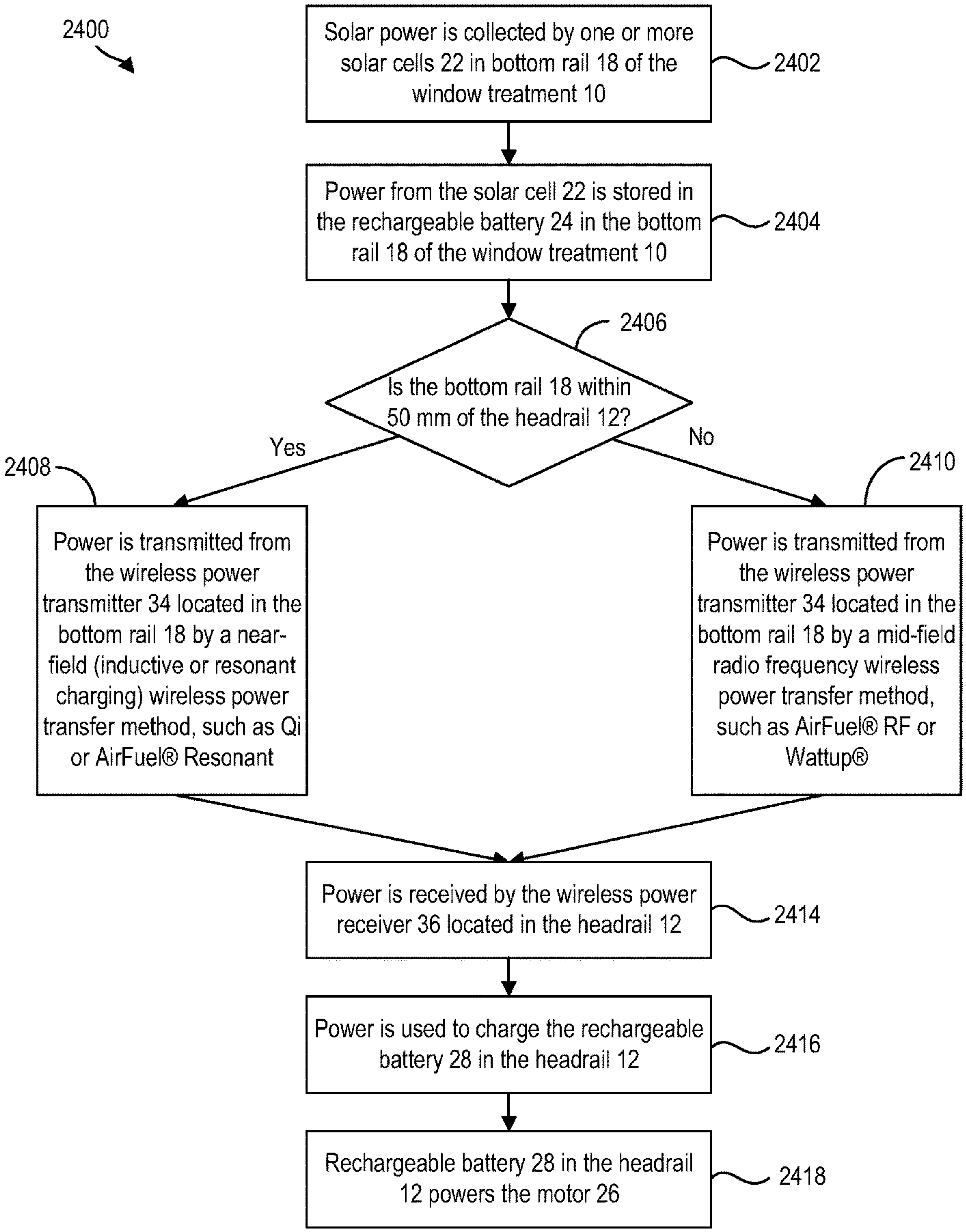
FIG. 24 is a simplified flowchart showing a visual representation of the sequence of steps and decisions to be performed by one embodiment of the self-contained, self-regulating, intelligent automated window treatment when wirelessly transferring solar power collected by the solar panel in the bottom rail to the motor in the headrail.

FIG. 24 is a simplified flowchart of an example method 2400 of the procedure that an embodiment of the self-contained, self-regulating intelligent automated motorized window treatment with increased energy efficiency 10 may follow when wirelessly transferring solar power collected by the solar panel 22 in the bottom rail 18 to the motor 26 in the headrail 12.

As shown in method 2400, at 2402, solar power is collected by one or more solar cells 22 in the bottom rail 18 of the window treatment 10. At 2404, power from the solar cells 22 is stored in the rechargeable battery 24 in the bottom rail 18 of the window treatment 10. At 2406, a determination is made if the bottom rail 18 is within 50 mm of the headrail 12. If this is the case, at 2408, power is transmitted from the wireless power transmitter 34 located in the bottom rail 18 by a near-field (inductive or resonant charging) wireless power transfer method, such as Qi or AirFuel® Resonant. Otherwise, at 2410, power is transmitted from the wireless power transmitter 34 located in the bottom rail 18 by a mid-field radio frequency wireless power transfer method, such as AirFuel® RF or WattUp®. At 2414, power is received by the wireless power receiver 36 located in the headrail 12. At 2416, the power is used to charge the rechargeable battery 24 in the headrail 12. At 2418, the rechargeable battery 24 in the headrail 12 powers the motor 26.

Figure 25:
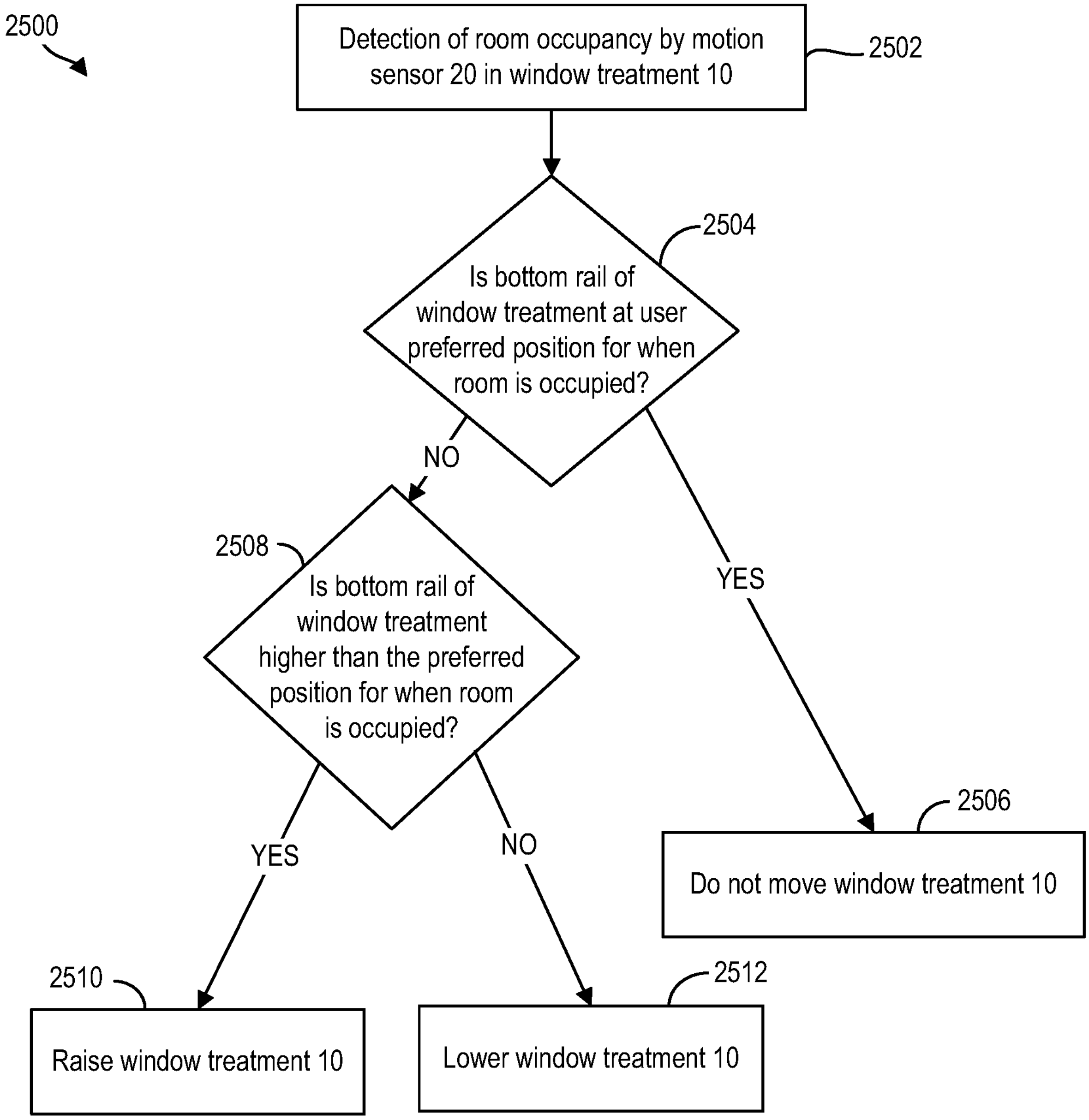
FIG. 25 is a simplified flowchart showing the sequence of steps and decisions to be performed by the self-contained, self-regulating, intelligent automated window treatment when determining whether to move the window treatment fabric and bottom rail to a user set preferred position in response to occupancy of the room detected by the motion detector.

FIG. 25 is a simplified flowchart of an example method 2500 of the procedure that an embodiment of the self-contained, self-regulating intelligent automated motorized window treatment with increased energy efficiency 10 may follow after receiving input from a motion sensor 20.

As shown in method 2500, at 2502 there is a detection of room occupancy by the motion sensor 20 in the window treatment 10. At 2504, a determination is made whether the bottom rail of the window treatment is at a user preferred position for when the room is occupied. If this is the case, at 2506, the window treatment 10 is not moved. Otherwise, at 2508, a determination is made as to whether the bottom rail of the window treatment is higher than the preferred position for when the room is occupied. If this is the case, then 2510, the window treatment 10 is raised, otherwise at 2512, the window treatment 10 is lowered.

Figure 26:
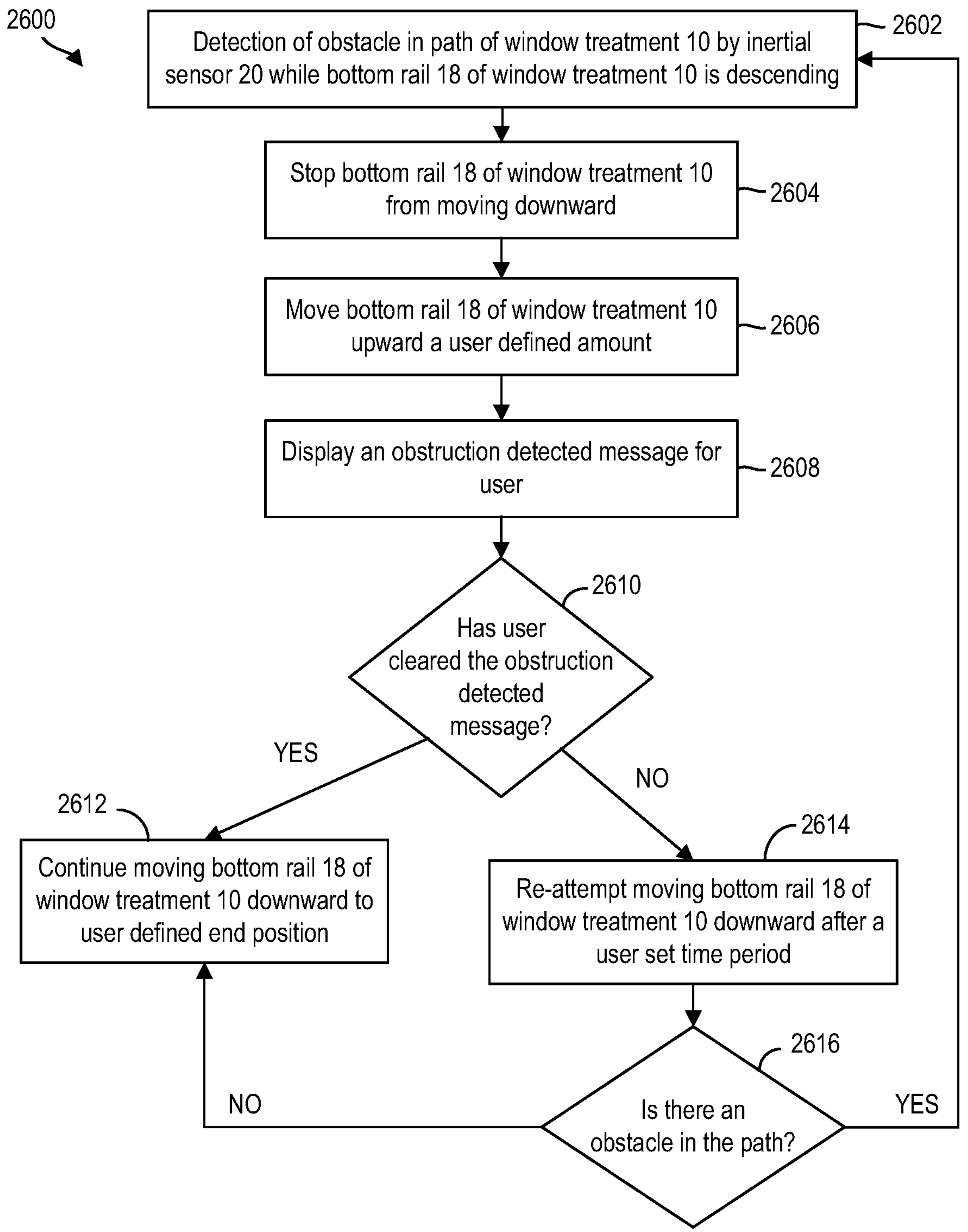
FIG. 26 is a simplified flowchart of the procedure that an embodiment of the self-contained, self-regulating intelligent automated motorized window treatment with increased energy efficiency may follow after receiving input from an inertial sensor.

FIG. 26 is a simplified flowchart of an example method 2600 of the procedure that an embodiment of the self-contained, self-regulating intelligent automated motorized window treatment with increased energy efficiency 10 may follow after receiving input from an inertial sensor 20.

As shown in method 2600, at 2602, the inertial sensor 20 is used to detect an obstacle in the path of the window treatment 10 while the bottom rail 18 of the window treatment 10 is descending. At 2604, the bottom rail 18 of the window treatment 10 is stopped from moving downward. At 2606, the bottom rail 18 of the window treatment 10 is moved upward by a user defined amount. At 2608, a message is displayed to the user that an obstruction is detected. At 2610, a determination is made whether the user has cleared the obstruction in the message. If so, at 2612, the bottom rail 18 of the window treatment 10 is continued movement downward to the user defined end position. Otherwise, at 2614, a re-attempt is made to move the bottom rail 18 of the window treatment 10 downward after a user set time period. At 2616, a determination is made whether there is an obstacle in the path. If an obstacle is detected, the method returns to act 2612, otherwise the method returns to act 2602.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

The invention claimed is:

1. A window treatment system comprising:

a headrail housing a motor, a first power source configured to power the motor, and a receiver operable to receive wirelessly transmitted power to charge the first power source;

a window shade fabric extending between a first terminus and a spaced apart second terminus, wherein the first terminus is affixed inside the headrail and is raised and lowered by the motor;

a bottom rail attached to the second terminus of the shade fabric, the bottom rail comprising an inertial sensor, a second power source, and a transmitter, wherein the transmitter is operable to: upon determining that the bottom rail is within a predetermined distance of the headrail, wirelessly transmit power from the second power source to the receiver in the headrail, using a first wireless power transmission technique, and upon determining that the bottom rail is not within the predetermined distance of the headrail, wirelessly transmit power from the second power source to the receiver in the headrail using a second wireless power transmission technique, wherein the first wireless power transmission technique is different than the second wireless power transmission technique;

a control button being coupled to the inertial sensor and the motor, the control button being operable for:

controlling the motor to lower the bottom rail along a downward path to an end position;

monitoring, via the inertial sensor, for obstructions in the downward path;

in response to detecting an obstruction, controlling the motor to raise the bottom rail a predefined distance; and controlling the motor to re-attempt to lower the bottom rail to the predefined end position while monitoring, via the inertial sensor, for obstructions in the downward path.

2. The window treatment system of claim 1, wherein the at least one inertial sensor is one or more of an accelerometer, a gyroscope or a magnetometer.

3. The window treatment system of claim 1, wherein the control button is configured to control the motor to re-attempt to lower the bottom rail after waiting a predetermined duration of time.

4. The window treatment system of claim 1, wherein the control button is further coupled to a display screen, and in response to detecting an obstruction, the control button is configured to display, on the display screen, an obstruction detected message.

5. The window treatment system of claim 4, wherein in response to receiving an indication from the inertial sensor that the obstruction is cleared, the control button is further configured for controlling the motor to lower the bottom rail while continuing to monitor for the obstruction.

6. The window treatment system of claim 5, wherein after the obstruction is detected, the control button is configured to control the motor to lower the bottom rail after determining the earlier of:

the indication from the inertial sensor that the obstruction is cleared; and a predetermined duration of time has elapsed.

7. The window treatment system of claim 4, wherein the control button and the display screen are included in a smart system unit affixed to one of the bottom rail or the headrail.

8. The window treatment system of claim 7, wherein at least one of the first power source and the second power source comprises a rechargeable battery, and the rechargeable battery is included in the smart system unit.

9. The window treatment system of claim 1, wherein the headrail further houses a tube, and the first terminus of the shade fabric is affixed and wrapped around the tube, and the control button is operable to control the descent and ascent of the bottom rail via the motor in the headrail by rotating the tube.

10. The window treatment system of claim 1, wherein at least one of the headrail and bottom rail houses at least one solar panel, the at least one solar panel being electrically coupled to the first power source or the second power source.

11. A method for operating a window treatment system comprising a headrail having a first power source, a bottom rail having a second power source, and a window shade fabric extending between a first terminus and a spaced apart second terminus, wherein the first terminus is affixed inside the headrail and the second terminus is attached to the bottom rail, the method comprising:

transmitting, via a transmitter in the bottom rail, power from the second power source wirelessly to a receiver in the headrail, using a wireless power transmission technique, to charge the first power source;

controlling a motor, via the first power source, to lower the bottom rail along a downward path to a predefined end position;

monitoring, via an inertial sensor, for obstructions in the downward path;

in response to detecting an obstruction, controlling the motor to raise the bottom rail a pre-defined upward distance; and controlling the motor to re-attempt to lower the bottom rail to the predefined end position while monitoring, via the inertial sensor, for obstructions in the downward path;

wherein the transmitter is operable to: upon determining that the bottom rail is within a predetermined distance of the headrail, wirelessly transmit power from the second power source to the receiver in the headrail, using a first wireless power transmission technique, and upon determining that the bottom rail is not within the predetermined distance of the headrail, wirelessly transmit power from the second power source to the receiver in the headrail using a second wireless power transmission technique, wherein the first wireless power transmission technique is different than the second wireless power transmission technique.

12. The method of claim 11, wherein the at least one inertial sensor is one or more of an accelerometer, a gyroscope or a magnetometer.

13. The method of claim 11, wherein the method further comprises:

re-attempting to lower the bottom rail after waiting a predetermined duration of time.

14. The method of claim 11, wherein the method further comprises:

in response to detecting an obstruction, displaying, on a display screen, an obstruction detected message.

15. The method of claim 14, wherein the method further comprises:

in response to receiving an indication from the inertial sensor that the obstruction is cleared, controlling the headrail motor to lower the bottom rail while continuing to monitor.

16. The method of claim 15, wherein after the obstruction is detected, the method further comprises:

controlling the motor to lower the bottom rail after determining the earlier of:

the indication from the inertial sensor that the obstruction is cleared; or a predetermined duration of time has elapsed.

17. The method of claim 14, wherein the control button, display screen and the inertial sensor are included in a smart system unit affixed to one of the bottom rail or the headrail.

18. The method of claim 17, wherein at least one of the first power source and the second power source comprises a rechargeable battery, and the rechargeable battery is included in the smart system unit.

19. The method of claim 11, wherein the headrail further houses a tube, and the first terminus of the shade fabric is affixed and wrapped around the tube, and the method further comprises: controlling the descent and ascent of the bottom rail via the motor in the headrail by rotating the tube.

20. The method of claim 11, wherein at least one of the headrail and bottom rail houses at least one solar panel, the at least one solar panel being electrically coupled to the first power source or the second power source.

* * * * *